(12) United States Patent
Yamamoto et al.

(10) Patent No.: US 8,982,454 B2
(45) Date of Patent: Mar. 17, 2015

(54) MICROSCOPE AND FILTER INSERTING METHOD

(75) Inventors: Takashi Yamamoto, Tokyo (JP); Norihiro Tanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 13/210,057

(22) Filed: Aug. 15, 2011

(65) Prior Publication Data

US 2012/0050850 A1    Mar. 1, 2012

(30) Foreign Application Priority Data

Aug. 27, 2010   (JP) ................................. 2010-190926

(51) Int. Cl.
 *G02B 21/18* (2006.01)
(52) U.S. Cl.
 CPC ...................................... *G02B 21/18* (2013.01)
 USPC .......................................................... 359/370
(58) Field of Classification Search
 CPC ..... G02B 21/0056; G02B 21/14; G02B 21/52
 USPC ............ 359/223.1, 225.1, 226.1, 226.2, 234, 359/362–398, 580, 583, 584, 589–590
 See application file for complete search history.

(56) References Cited

U.S. PATENT DOCUMENTS

| | | | | |
|---|---|---|---|---|
| 4,845,352 A | * | 7/1989 | Benschop | 250/201.7 |
| 5,932,872 A | * | 8/1999 | Price | 250/201.3 |
| 2004/0051051 A1 | * | 3/2004 | Kato et al. | 250/458.1 |
| 2004/0223214 A1 | * | 11/2004 | Atkinson | 359/385 |
| 2006/0181766 A1 | * | 8/2006 | Uhl et al. | 359/368 |
| 2006/0280352 A1 | * | 12/2006 | Muschler et al. | 382/133 |
| 2007/0279735 A1 | * | 12/2007 | Sieckmann | 359/396 |
| 2008/0088918 A1 | * | 4/2008 | O'Connell | 359/371 |
| 2008/0176332 A1 | * | 7/2008 | Berns et al. | 436/55 |
| 2010/0053740 A1 | * | 3/2010 | Nishiwaki | 359/370 |
| 2011/0090553 A1 | * | 4/2011 | Kei | 359/235 |

FOREIGN PATENT DOCUMENTS

JP        2003-222807        8/2003

* cited by examiner

*Primary Examiner* — Scott J Sugarman
*Assistant Examiner* — Jeffrey Madonna
(74) *Attorney, Agent, or Firm* — K&L Gates LLP

(57) ABSTRACT

A microscope includes a first imaging optical system that images light beams from a cell tissue sample, a second imaging optical system having a light beam splitting element which splits a portion of the light beams from the cell tissue sample from the first imaging optical system, an imaging element which captures phase contrast images of a portion of the light beams, which have been split, from the cell tissue sample, and one or a plurality of optical elements which forms the phase contrast images on the imaging element, and a filter inserting unit that inserts an optical filter absorbing light of a predetermined wavelength into an optical path of the second imaging optical system, wherein the filter inserting unit inserts the optical filter absorbing light of a wavelength corresponding to a complementary color of a color of an observed target according to the color of the observed target.

8 Claims, 13 Drawing Sheets

MICROSCOPE AND FILTER INSERTING METHOD

CROSS REFERENCES TO RELATED APPLICATIONS

The present application claims priority to Japanese Priority Patent Application JP 2010-190926 filed in the Japan Patent Office on Aug. 27, 2010, the entire contents of which are hereby incorporated by reference.

BACKGROUND

The present disclosure relates to a microscope and a filter inserting method.

A technique has been proposed in which, using a microscope used to observe a sample such as a cell tissue slide, an image of a sample observed by the microscope is preserved as a digital image, and the preserved digital image is observed from other devices provided on the Internet or an intranet (for example, refer to the following Japanese Unexamined Patent Application Publication No. 2003-222801). By the use of this technique, it is possible to promote advancements in so-called telepathology where a doctor in a remote location performs a pathological diagnosis using a network.

SUMMARY

Here, in the above-described microscope, in a case where digital images for a large number of the microscope observation images of samples are generated, particularly, accuracy of focusing on an observed target is necessary in automatic focusing.

Meanwhile, a sample such as cell tissue is not only observed as it is in a state of being collected from various kinds of biological sites, but there are cases where a structure as an observed target is stained in a specific color using various kinds of staining methods. At this time, since colors in the sample differ from each other due to influence of spherical aberration, a focal position optimal for the observation (that is, imaging) varies by about 1 μm. Such defocus may be a factor which hinders an image from being clear in a microscope having a low depth of field.

It is desirable to provide a microscope and a filter inserting method, capable of performing focusing with more accuracy according to a color difference in a sample.

According to an embodiment, there is provided a microscope including a first imaging optical system that images light beams from a cell tissue sample placed on a stage; a second imaging optical system having a light beam splitting element which splits a portion of the light beams from the cell tissue sample from the first imaging optical system, an imaging element which captures phase contrast images of a portion of the light beams, which have been split, from the cell tissue sample, and one or a plurality of optical elements which forms the phase contrast images on the imaging element; and a filter inserting unit that inserts an optical filter absorbing light of a predetermined wavelength into an optical path of the second imaging optical system, wherein the filter inserting unit inserts the optical filter which absorbs light of a wavelength corresponding to a complementary color of a color of an observed target according to the color of the observed target in the cell tissue sample.

The second imaging optical system may at least include a condensing lens that collects a portion of the light beams from the cell tissue sample, split by the light beam splitting element; and a separator lens that generates phase contrast images of a portion of the light beams from the cell tissue sample, collected by the condensing lens. In this case, the filter inserting unit may insert the optical filter between the light beam splitting element and the condensing lens.

The second imaging optical system may at least include a condensing lens that collects a portion of the light beams from the cell tissue sample, split by the light beam splitting element; and a separator lens that generates phase contrast images of a portion of the light beams from the cell tissue sample, collected by the condensing lens. In this case, the filter inserting unit inserts the optical filter into the rear side of the condensing lens.

The cell tissue sample may include sample information regarding a staining method of cell tissue and at least one of parts of the cell tissue, and, here, the filter inserting unit may automatically select the optical filter to be inserted based on the sample information.

The sample information may be described as a label for the cell tissue sample.

The sample information may be described in the cell tissue sample as a bar code.

The sample information may be described in an RF tag which is embedded in the cell tissue sample.

According to another embodiment, there is provided a filter inserting method including causing a light beam splitting element to split a portion of light beams from a cell tissue sample from a first imaging optical system which images the light beams from the cell tissue sample placed on a stage; inserting an optical filter absorbing light of a predetermined wavelength into an optical path of a portion of the light beams, which have been split, from the cell tissue sample; and capturing phase contrast images of a portion of the light beams from the cell tissue sample, transmitted through the optical filter, wherein the inserting of the optical filter includes inserting the optical filter which absorbs light of a wavelength corresponding to a complementary color of a color of an observed target according to the color of the observed target in the cell tissue sample.

As described above, according to the present application, it is possible to perform focusing with more accuracy according to a color difference in a sample.

Additional features and advantages are described herein, and will be apparent from the following Detailed Description and the figures.

DETAILED DESCRIPTION

Figure 1:
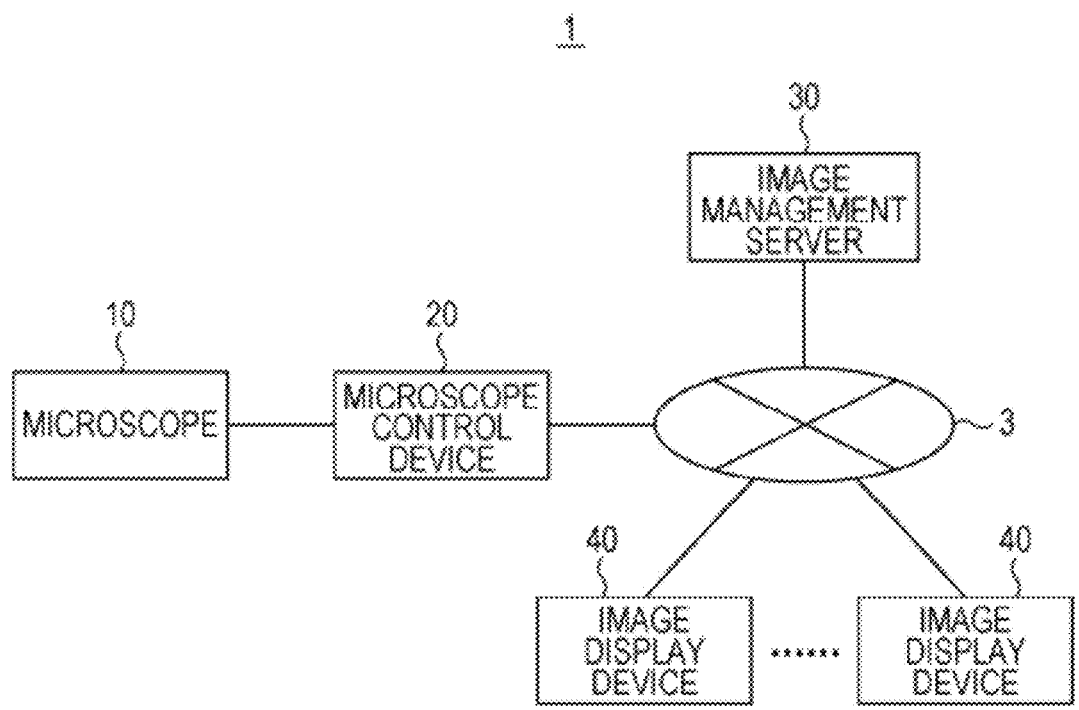
FIG. 1 is a diagram illustrating a configuration of a microscope image management system according to a first embodiment.

Embodiments of the present application will be described below in detail with reference to the drawings.

In addition, in the specification and the drawings, constituent elements having substantially the same functions and configurations are given the same reference numerals, and repeated description will be omitted.

The description will be made in the following order.
1 First Embodiment
 1-1 Configuration of Microscope Image Management System
 1-2 Entire Configuration of Microscope
 1-3 Entire Configuration of Microscope Control Device
 1-4 Configuration of Overall Control Unit
 1-5 Automatic Focusing on Cell Tissue Sample
 1-6 Detailed Configuration of Defocus Amount Detection Unit
 1-7 Flow of Filter Inserting Method
2 Hardware Configuration of Microscope Control Device according to Embodiment of Present Application
3 Conclusion Hereinafter, although as a sample imaged by a microscope, a biological sample (a cell tissue sample) including a slice of tissue such as connective tissue such as blood, epithelial tissue, or both types of tissue, or smear cells is described as an example, the present application is not limited thereto.

First Embodiment

Configuration of Microscope Image Management System

First, a configuration of a microscope image management system 1 according to a first embodiment will be described with reference to FIG. 1. FIG. 1 is a diagram illustrating a configuration of the microscope image management system 1 according to the embodiment.

The microscope image management system 1 according to the embodiment includes a microscope 10, a microscope control device 20, an image management server 30, and an image display device 40 as shown in FIG. 1. The microscope control device 20, the image management server 30, and the image display device 40 are connected to each other via a network 3.

The network 3 is a communication network which can connect the microscope control device 20, the image management server 30, and the image display device 40 according to the embodiment to each other so as to communicate in a bidirectional manner. The network 3 includes, for example, public networks such as the Internet, a telephone network, a satellite communication network, or a broadcast line, or a dedicated network such as a WAN (Wide Area Network), an LAN (Local Area Network), an IP-VPN (Internet Protocol-Virtual Private Network), an Ethernet (registered trademark), or a wireless LAN, and includes wired or wireless networks.

In addition, the network 3 may be a communication network dedicated to the microscope image management system 1 according to the embodiment.

The microscope 10 illuminates a sample (for example, a biological sample) placed on a stage of the corresponding microscope 10 with predetermined illumination light, and images light transmitted through the sample or light emitted from the sample. An entire configuration of the microscope 10 according to the embodiment will be described below again in detail.

The microscope 10 is controlled to be driven by the microscope control device 20, and a sample image captured by the microscope 10 is stored in the image management server 30 via the microscope control device 20.

The microscope control device 20 controls driving of the microscope 10 which images a sample. The microscope control device 20 controls the microscope 10 to capture a digital image of the sample and performs predetermined digital processing for the obtained digital image data for the sample. In addition, the microscope control device 20 uploads the obtained digital image data for the sample to the image management server 30.

The image management server 30 stores the digital image data for the sample which has been imaged by the microscope 10, and manages the digital image data. When the digital image data for the sample is output from the microscope control device 20, the image management server 30 stores the obtained digital image data for the sample in a predetermined storage region such that an observer can use it. Further, the image management server 30 provides digital image data for a corresponding sample to the image display device 40 when the observer makes a request for observing of the digital image data for the sample from the image display device 40 (that is, a device corresponding to the viewer) which is operated by the observer.

The image display device 40 is a terminal (that is, a device corresponding to the viewer) which is operated by an observer who wants to observe digital image data for a sample. The observer who wants to observe digital image data refers to a list of digital image data or the like stored in the image management server 30, specifies digital image data which is desired to be observed, and requests the image management server 30 to provide the specified digital image data. When the digital image data is provided from the image management server 30, the observer can observe the digital image data by displaying an image corresponding thereto on a display or the like of the image display device 40.

Detailed configurations of the microscope control device 20 and the image management server 30 according to the embodiment will be described below again.

In FIG. 1, although the case where the microscope 10, the microscope control device 20, and the image management server 30 included in the system 1 respectively exist singly is shown, the numbers of the microscope 10, the microscope control device 20, and the image management server 30 included in the microscope image management system 1 are not limited to the example shown in FIG. 1, but may be a plurality, respectively.

Entire Configuration of Microscope

Figure 2:
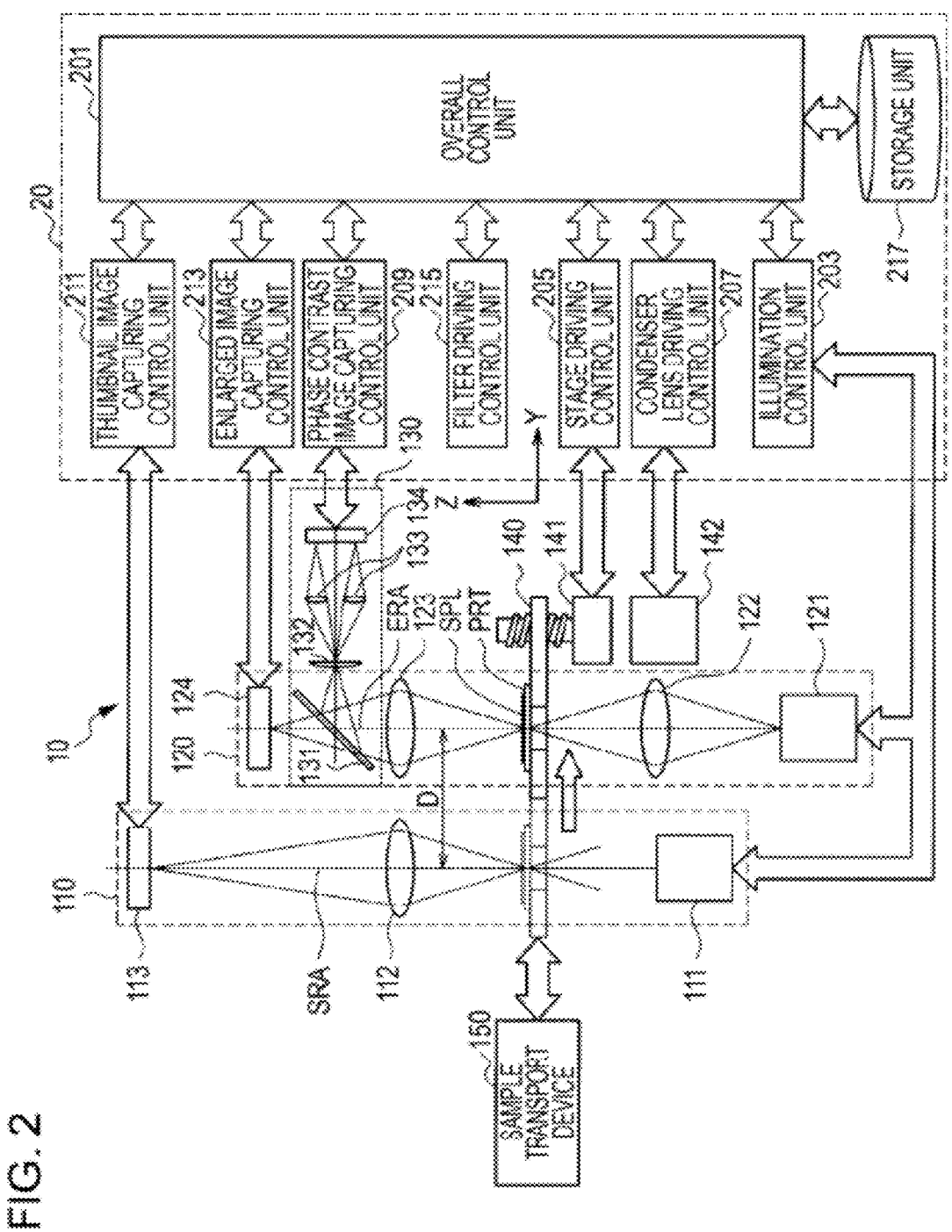
FIG. 2 is a diagram illustrating overall configurations of a microscope and a microscope control device according to the same embodiment.

Next, with reference to FIG. 2, an entire configuration of the microscope 10 according to the embodiment will be described. FIG. 2 is a diagram illustrating an entire configuration of the microscope 10 and the microscope control device 20 according to the embodiment.

Entire Configuration

The microscope 10 according to the embodiment includes, as exemplified in FIG. 2, a thumbnail image capturing unit 110 which captures an entire image of a preparation PRT (hereinafter, this image is also referred to as a thumbnail image) on which a biological sample SPL is placed, and an enlarged image capturing unit 120 which captures an image to which the biological sample SPL is enlarged at a predetermined magnification (hereinafter, this image is also referred to as an enlarged image). In addition, the enlarged image capturing unit 120 includes a defocus amount detection unit 130 for detecting a defocus amount of an illumination field stop provided in the enlarged image capturing unit 120.

The preparation PRT fixes a biological sample SPL including a slice of tissue such as connective tissue such as blood, epithelial tissue, or both types of tissue, or smear cells, to a slide glass by a predetermined fixing method. This tissue slice or smear cells undergo various kinds of staining as necessary. The staining does not include only a general stain such as an HE (Hematoxylin-Eosin) stain, a Giemsa stain, or a Papanicolaou stain, a Ziehl-Neelsen stain, or a Gram stain, but also a fluorescent stain such as FISH (Fluorescence In-Situ Hybridization) or an enzyme labeled antibody method.

The microscope 10 according to the embodiment is provided with a stage 140 on which the above-described preparation PRT is placed, and a stage driving mechanism 141 for moving the stage 140 in various directions. The stage 140 can be freely moved in directions (X axis direction and Y axis direction) parallel to the stage surface and in a direction perpendicular thereto (Z axis direction) by the stage driving mechanism 141.

In addition, the enlarged image capturing unit 120 is provided with a condenser lens driving mechanism 142 which is an example of an illumination field stop focal point adjustment unit.

The microscope 10 according to the embodiment may be provided with a sample transport device 150 which transports the preparation PRT including the sample SPL to the stage 140. The transport device 150 can automatically place a sample which is scheduled to be imaged on the stage 140 and automatically change the samples SPL.

Thumbnail Image Capturing Unit

The thumbnail image capturing unit 110 mainly includes, as shown in FIG. 2, a light source 111, an objective lens 112, and an imaging element 113.

The light source 111 is provided at an opposite side to the surface side of the stage 140 where the preparation is disposed. The light source 111 can change between light (hereinafter, also referred to as bright field illumination light, or simply illumination light) applied to a biological sample SPL for which general staining is performed, and light (hereinafter, also referred to as a dark field illumination light) applied to a biological sample SPL for which special staining is performed, for illumination. In addition, the light source 111 may apply either the bright field illumination light or the dark field illumination light. In this case, as the light source 111, two light sources are provided, that is, a light source for applying the bright field illumination light and a light source for applying the dark field illumination light.

In the thumbnail image capturing unit 110, a label light source (not shown) which applies light used to image additional information described in the label attached to the preparation PRT, may be provided separately.

The objective lens 112 having a predetermined magnification has the normal line of the reference position of the thumbnail image capturing unit 110 in the surface where the preparation is disposed as the optical axis SRA, and is installed in the surface side of the stage 140 where the preparation is disposed. Light passing through the preparation PRT installed on the stage 140 is collected at the objective lens 112, and enables an image to be formed on the imaging element 113 provided on the rear side of the objective lens 112 (that is, the traveling direction of the illumination light).

The imaging element 113 forms an image corresponding to light in an imaging range including the overall preparation PRT (in other words, light passing through the overall preparation PRT) placed on the surface of the stage 140 where the preparation is disposed. An image formed on the imaging element 113 is a thumbnail image which is a microscope image containing the overall preparation PRT.

Enlarged Image Capturing Unit

As shown in FIG. 2, the enlarged image capturing unit 120 mainly includes a light source 121, a condenser lens 122, an objective lens 123, and an imaging element 124. Further, the enlarged image capturing unit 120 is also provided with the illumination field stop (not shown).

The light source 121 applies a bright field illumination light, and is provided at an opposite side to the surface side of the stage 140 where the preparation is disposed. In addition, a light source (not shown) for applying a dark field illumination light is provided at a position (for example, the surface side where the preparation is disposed) different from the position of the light source 121.

The condenser lens 122 collects the bright field illumination light provided from the light source 121 or the dark field illumination light provided from a light source for dark field illumination and guides it to the preparation PRT on the stage 140. The condenser lens 122 has the normal line of the reference position of the enlarged image capturing unit 120 in the surface where the preparation is disposed as the optical axis ERA, and is installed between the light source 121 and the stage 140. In addition, the condenser lens driving mechanism 142 can drive the condenser lens 122 along the direction of the optical axis ERA. The condenser lens 122 can change its positions on the optical axis ERA by the condenser lens driving mechanism 142.

The objective lens 123 having a predetermined magnification has the normal line of the reference position of the enlarged image capturing unit 120 in the surface where the preparation is disposed as the optical axis ERA, and is installed in the surface side of the stage 140 where the preparation is disposed. The enlarged image capturing unit 120 can image the biological sample SPL through enlargement at various magnifications by appropriately exchanging the objective lenses 123. The light passing through the preparation PRT placed on the stage 140 is collected by the objective lens 123, and enables an image to be formed on the imaging element 124 which is provided on the rear side of the objective lens (that is, the traveling direction of the illumination light).

Further, a beam splitter 131 may be provided on the optical axis ERA between the objective lens 123 and the imaging element 124. In the case where the beam splitter 131 is provided, a portion of transmitted light beams which are transmitted through the objective lens 123 is guided to the defocus amount detection unit 130 described later.

An image in an imaging range including a predetermined longitudinal width and transverse width on the surface of the stage 140 where the preparation is disposed, is formed on the imaging element 124 depending on the pixel size of the imaging element 124 and the magnification of the objective lens 123. Further, since a part of the biological sample SPL is enlarged by the objective lens 123, the above-described imaging range is sufficiently narrower than the imaging range of the imaging element 113.

Here, as shown in FIG. 2, the thumbnail image capturing unit 110 and the enlarged image capturing unit 120 are disposed to be spaced apart from each other by the distance D in the Y axis direction in terms of the optical axis SRA and the optical axis ERA which are respectively the normal lines of the reference positions. The distance D is set such that a microscope tube (not shown) which holds the objective lens 123 of the enlarged image capturing unit 120 is not included in the imaging range of the imaging element 113, and further the size is minimized.

Defocus Amount Detection Unit

The defocus amount detection unit 130 mainly includes, as shown in FIG. 2, the beam splitter 131, a field lens 132, a separator lens 133, and an imaging element 134. In addition, the defocus amount detection unit 130 is provided with a filter inserting mechanism (not shown in FIG. 2) described later, and inserts an optical filter which absorbs light of a predetermined wavelength into an optical path of the defocus amount detection unit 130.

The beam splitter 131 is, as described above, provided on the optical axis ERA between the objective lens 123 and the imaging element 124 of the enlarged image capturing unit 120, and reflects a portion of transmitted light beams which are transmitted through the objective lens 123. In other words, the transmitted light beams which are transmitted through the objective lens 123 are split into transmitted light beams which travel toward the imaging element 124 and reflected light beams which travel toward the field lens 132 inside the defocus amount detection unit 130 described later, by the beam splitter 131.

The field lens 132 is provided on the traveling direction side of the reflection light beams split by the beam splitter 131. The field lens 132 collects the reflection light beams split by the beam splitter 131 and guides them to the separator lens 133 disposed on the rear side of the field lens 132 (the traveling direction side of the reflection light beams).

The separator lens 133 divides the light beams guided from the field lens 132 into two light beams. The divided light beams form a set of subject images on an image forming surface of the imaging element 134 which is disposed on the rear side (the traveling direction side of the reflection light beams) of the separator lens 133.

The light beams which are transmitted through the separator lens 133 respectively form images on the imaging element 134. As a result, a set of subject images are formed on the imaging surface of the imaging element 134. Since the light beams in various directions emitted from the field lens 132 are incident to the separator lens 133, a phase contrast occurs between a set of the subject images. Hereinafter, a set of the subject images is referred to as phase contrast images.

Figure 3:
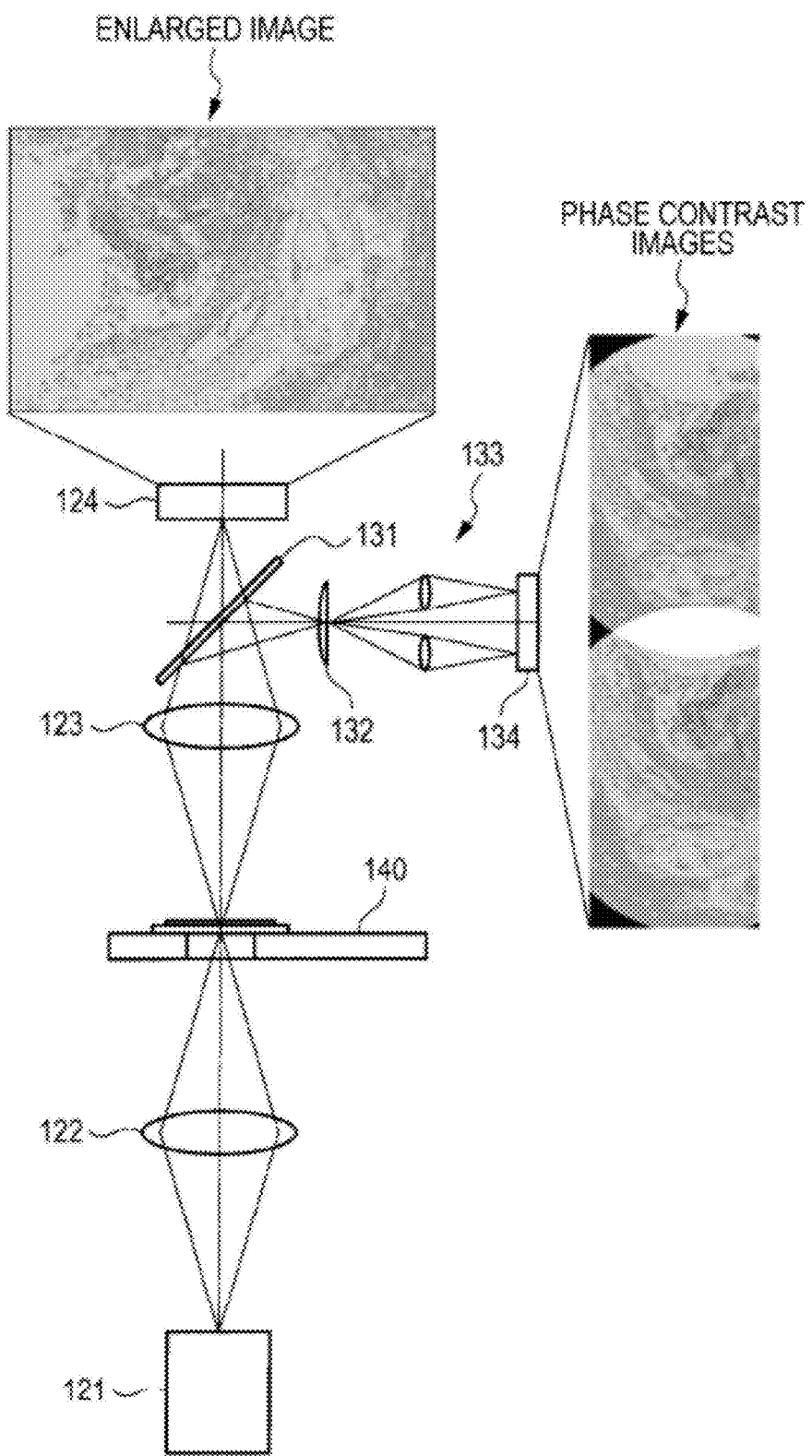
FIG. 3 is a diagram illustrating an example of an enlarged image and phase contrast images of a sample.

Next, an example of an enlarged image captured by the enlarged image capturing unit 120 and phase contrast images captured by the defocus amount detection unit 130 will be described briefly. FIG. 3 is a diagram illustrating an example of an enlarged image and phase contrast images of a sample.

In the microscope 10 according to the embodiment, the beam splitter 131 is disposed on the rear side of the objective lens 123, and the light beams transmitted through the objective lens 123 form images on the imaging element 124 provided in the enlarged image capturing unit 120 and the imaging element 134 provided in the defocus amount detection unit 130. Here, the phase contrast images formed on the imaging element 134 are, as shown in FIG. 3, for example, a set of images corresponding to an image viewed by the left eye and an image viewed by the right eye, and a phase contrast between the images occurs. For this reason, if the phase contrast is decreased, the two images of the phase contrast images are shifted to be far away from each other, and if the phase contrast is increased, the two images of the phase contrast images are shifted to be close to each other.

Here, in the following description, one of a set of the images forming the phase contrast images is referred to as a reference image, and the other image is referred to as a comparative image. The reference image is an image which is used as a reference when a phase contrast in phase contrast images is specified, and the comparative image is an image which is compared with the reference image when the phase contrast in the phase contrast images is specified.

Figure 4:
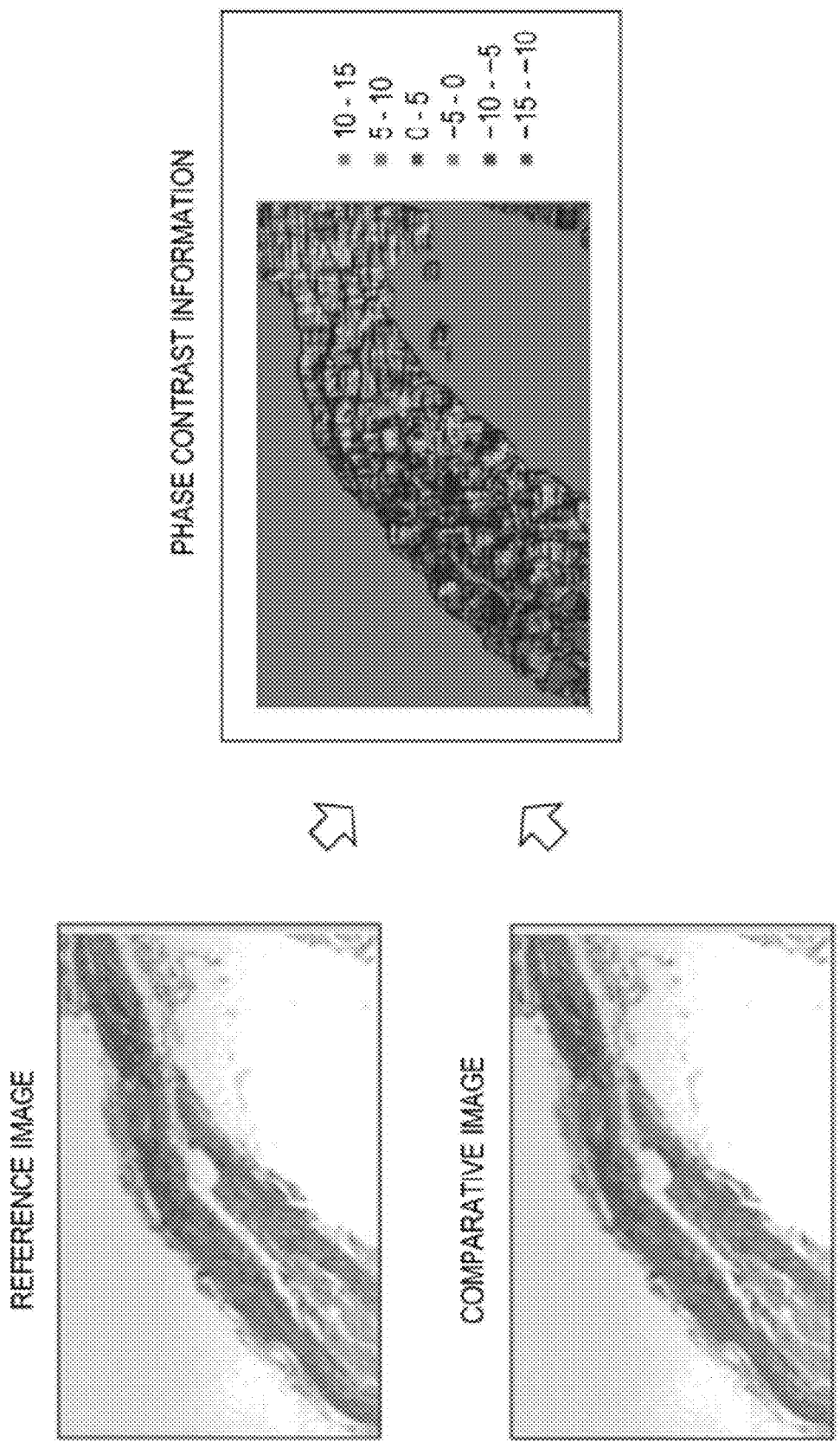
FIG. 4 is a diagram illustrating an example of phase contrast information generated based on the phase contrast images.

Such a phase contrast is specified for each of pixels forming the phase contrast images, thereby generating phase contrast information indicating distributions of phase contrasts in the overall phase contrast images, as shown in FIG. 4. Here, since the phase contrast between the two images is a physical characteristic value which can be converted into concave and convex of a sample, information regarding the concave and convex of the sample can be obtained by obtaining the phase contrast information.

As above, the defocus amount detection unit 130 according to the embodiment has been described briefly. The defocus amount detection unit 130 according to the embodiment will be described below again in detail.

In addition, in the above description, although the case where the beam splitter 131 is provided between the objective lens 123 and the imaging element 124 has been described, a beam splitting unit for splitting light beams is not limited to the beam splitter but may use a movable mirror or the like.

In addition, in the above description, although the configuration in which the field lens, the separator lens, and the imaging element are provided as the phase contrast AF optical system inside the defocus amount detection unit 130 has been described, the present application is not limited to this example. The phase contrast AF optical system may use, for example, a condenser lens and twin lenses instead of the field lens and the separator lens, or other optical systems as long as they can realize the equivalent function.

As above, the entire configuration of the microscope 10 according to the embodiment has been described in detail with reference to FIG. 2.

In addition, the imaging element provided in each of the thumbnail image capturing unit 110, the enlarged image capturing unit 120, and the defocus amount detection unit 130 may be a one-dimensional imaging element or a two-dimensional imaging element.

Further, in the above-described example, although the case where the defocus amount detection unit 130 is provided in the traveling direction of the light beams reflected by the beam splitter 131 has been described, the defocus amount detection unit 130 may be provided in a traveling direction of light beams transmitted through the beam splitter 131.

Entire Configuration of Microscope Control Device

The microscope 10 according to the embodiment is connected to the microscope control device 20 for controlling various parts of the microscope as shown in FIG. 2. The microscope control device 20 mainly includes, as shown in FIG. 2, an overall control unit 201, an illumination control unit 203, a stage driving control unit 205, a condenser lens driving control unit 207, a phase contrast image capturing control unit 209, a thumbnail image capturing control unit 211, an enlarged image capturing control unit 213, a filter driving control unit 215, and a storage unit 217.

Here, the illumination control unit 203 is a processing unit which controls various kinds of light sources including the light source 111 and the light source 121 provided in the microscope 10, and the stage driving control unit 205 is a processing unit which controls the stage driving mechanism 141. The condenser lens driving control unit 207 is a processing unit which controls the condenser lens driving mechanism 142, and the phase contrast image capturing control unit 209 is a process unit which controls the imaging element 134 for capturing phase contrast images. In addition, the thumbnail image capturing control unit 211 is a processing unit which controls the imaging element 113 for capturing a thumbnail image, and the enlarged image capturing control unit 213 is a processing unit which controls the imaging element 124 for capturing an enlarged image of the biological sample SPL. In addition, the filter driving control unit 215, as described later, is a control unit which controls a filter inserting mechanism (not shown in FIG. 2) inserting a filter which absorbs light of a predetermined wavelength, into an optical path of the defocus amount detection unit 130. These control units are connected to the parts which are controlled via various kinds of data communication paths.

In the microscope control device 20 according to the embodiment, the control unit (the overall control unit 201) which controls the overall microscope is provided separately, and is connected to the above-described control units via various kinds of data communication paths.

The control units are implemented by a CPU (Central Processing Unit), a ROM (Read Only Memory), a RAM (Random Access Memory), a storage device, a communication device, an operational circuit, and the like.

The storage unit 217 is an example of a storage device provided in the microscope control device 20 according to the embodiment. The storage unit 217 stores various kinds of setting information for controlling the microscope 10 according to the embodiment, various kinds of databases, a lookup table, or the like. Further, the storage unit 217 may store various kinds of history information such as imaging history of samples in the microscope 10. In addition, the storage unit 217 appropriately records various parameters which are necessary to be preserved when the microscope control device 20 according to the embodiment performs a certain process, or a mid-flow progress of the process, or various kinds of databases or programs.

Each processing unit provided in the microscope control device 20 can freely read from and write in the storage unit 217.

Hereinafter, functions of the above-described control units will be described briefly.

Illumination Control Unit

The illumination control unit 203 is a processing unit which controls various light sources provided in the microscope 10 according to the embodiment. When information indicating an illumination method of the biological sample SPL is output from the overall control unit 201, the illumination control unit 203 controls illumination of a corresponding light source based on the obtained information indicating the illumination method.

For example, attention may be paid to a case where the light source 111 included in the thumbnail image capturing unit 110 is controlled by the illumination control unit 203. In this case, the illumination control unit 203 determines whether to perform either a mode for obtaining a bright field image (hereinafter, also referred to as a "bright field mode") or a mode for obtaining a dark field image (hereinafter, also referred to as a "dark field mode") by referring to the information indicating the illumination method. Thereafter, the illumination control unit 203 sets parameters according to each mode in the light source 111, and enables the light source 111 to apply illumination light suitable for each mode. Thereby, the illumination light provided from the light source 111 is applied to the overall biological sample SPL via an opening portion of the stage 140. In addition, as the parameters set by the illumination control unit 203, for example, the intensity of the illumination light, the kind of light source, or the like may be selected.

In addition, attention may be paid to a case where the light source 121 included in the enlarged image capturing unit 120 by the illumination control unit 203 is controlled. In this case, the illumination control unit 203 determines whether to perform either the bright field mode or the dark field mode by referring to the information indicating the illumination method. Thereafter, the illumination control unit 203 sets parameters according to each mode in the light source 121, and enables the light source 121 to apply illumination light suitable for each mode. Thereby, the illumination light provided from the light source 121 is applied to the overall biological sample SPL via the opening portion of the stage 140. In addition, as the parameters set by the illumination control unit 203, for example, the intensity of the illumination light, the kind of light source, or the like may be selected.

The illumination light in the bright field mode is preferably visible light. In addition, the illumination light in the dark field mode is preferably light including a wavelength which can excite a fluorescent marker used for the special staining. In the dark field mode, a background part of the fluorescent marker is cut out.

Stage Driving Control Unit

The stage driving control unit 205 is a processing unit which controls the stage driving mechanism 141 for driving the stage provided in the microscope 10 according to the embodiment. When information indicating an imaging method of the biological sample SPL is output from the overall control unit 201, the stage driving control unit 205 controls the stage driving mechanism 141 based on the obtained information indicating the imaging method.

For example, attention may be paid to a case where the microscope 10 according to the embodiment captures a thumbnail image. When information indicating that a thumbnail image of the biological sample SPL is captured is output from the overall control unit 201, the stage driving control unit 205 moves the stage 140 in the stage surface direction (X-Y axis direction) such that the overall preparation PRT is included in the imaging range of the imaging element 113. Further, the stage driving control unit 205 moves the stage 140 in the Z axis direction such that the objective lens 112 focuses on the overall preparation PRT.

In addition, attention may be paid to a case where the microscope 10 according to the embodiment captures an enlarged image. When information indicating that an enlarged image of the biological sample SPL is captured is output from the overall control unit 201, the stage driving control unit 205 controls driving of the stage driving mechanism 141 and moves the stage 140 in the stage surface direction such that the biological sample SPL is located from between the light source 111 and the objective lens 112 to between the condenser lens 122 and the objective lens 123.

The stage driving control unit 205 moves the stage 140 in the stage surface direction (the X-Y axis direction) such that a predetermined site of the biological sample is located in the imaging range of the imaging element 124.

In addition, the stage driving control unit 205 controls driving of the stage driving mechanism 141, and moves the stage 140 in the direction perpendicular to the stage surface (Z axis direction, a depth direction of the tissue slice) such that the objective lens 123 focuses on the site of the biological sample SPL located in the predetermined imaging range.

Condenser Lens Driving Control Unit

The condenser lens driving control unit 207 is a processing unit which controls the condenser lens driving mechanism 142 for driving the condenser lens 122 provided in the enlarged image capturing unit 120 of the microscope 10 according to the embodiment. When information regarding a defocus amount of the illumination field stop is output from the overall control unit 201, the condenser lens driving control unit 207 controls the condenser lens driving mechanism 142 based on the obtained information regarding the defocus amount.

If the illumination field stop provided in the enlarged image capturing unit 120 does not appropriately focus, the contrast of an enlarged image which is generated is reduced. In order to prevent the reduction in the contrast, the overall control unit 201 may specify a defocus amount of the illumination field stop based on phase contrast images generated by the defocus amount detection unit 130. The overall control unit 201 outputs information indicating the specified defocus amount of the illumination field stop to the condenser lens driving control unit 207, and changes positions of the condenser lens 122 such that the illumination field stop focuses.

The condenser lens driving control unit 207 controls driving of the condenser lens driving mechanism 142 and corrects a position of the condenser lens 122 (a position on the optical axis ERA) such that the illumination field stop focuses.

Phase Contrast Image Capturing Control Unit

The phase contrast image capturing control unit 209 is a processing unit which controls the imaging element 134 provided in the defocus amount detection unit 130. The phase contrast image capturing control unit 209 sets parameters according to the bright field mode or the dark field mode in the imaging element 134. In addition, when obtaining an output signal which is output from the imaging element 134 and corresponds to an image formed on the image forming surface of the imaging element 134, the phase contrast image capturing control unit 209 recognizes the obtained output signal as an output signal corresponding to phase contrast images. When obtaining the output signal corresponding to phase contrast images, the phase contrast image capturing control unit 209 outputs data corresponding to the obtained signal to the overall control unit 201. In addition, examples of the parameters set by the phase contrast image capturing control unit 209 include the starting timing and finishing timing of exposure (that is, an exposure time), and the like.

Thumbnail Image Capturing Control Unit

The thumbnail image capturing control unit 211 is a processing unit which controls the imaging element 113 provided in the thumbnail image capturing unit 110. The thumbnail image capturing control unit 211 sets parameters according to the bright field mode or the dark field mode in the imaging element 113. In addition, when obtaining an output signal which is output from the imaging element 113 and corresponds to an image formed on the image forming surface of the imaging element 113, the thumbnail image capturing control unit 211 recognizes the obtained output signal as an output signal corresponding to a thumbnail image. When obtaining the output signal corresponding to the thumbnail image, the thumbnail image capturing control unit 211 outputs data corresponding to the obtained signal to the overall control unit 201. Examples of the parameters set by the thumbnail image capturing control unit 211 include the starting timing and finishing timing of exposure, and the like.

Enlarged Image Capturing Control Unit

The enlarged image capturing control unit 213 is a processing unit which controls the imaging element 124 provided in the enlarged image capturing unit 120. The enlarged image capturing control unit 213 sets parameters according to the bright field mode or the dark field mode in the imaging element 124. In addition, when obtaining an output signal which is output from the imaging element 124 and corresponds to an image formed on the image forming surface of the imaging element 124, the enlarged image capturing control unit 213 recognizes the obtained output signal as an output signal corresponding to an enlarged image. When obtaining the output signal corresponding to the enlarged image, the enlarged image capturing control unit 213 outputs data corresponding to the obtained signal to the overall control unit 201. Examples of the parameters set by the enlarged image capturing control unit 213 include the starting timing and finishing timing of exposure, and the like.

Filter Driving Control Unit

The filter driving control unit 215 is a processing unit which controls a filter inserting mechanism (not shown in FIG. 2) for inserting an optical filter absorbing light of a predetermined wavelength into an optical path of the defocus amount detection unit 130. The filter driving control unit 215 sets a type of optical filter to be inserted in the filter inserting mechanism. In addition, the filter driving control unit 215 can control the filter inserting mechanism to remove or change an inserted optical filter or the like.

Overall Control Unit

The overall control unit 201 is a processing unit which controls the overall microscope including the above-described various control units. The overall control unit 201 obtains data regarding phase contrast images captured by the microscope 10, and can calculate a defocus amount of the illumination field stop or a thickness variation amount of the slide glass, based on the phase contrast image data. By the use of the defocus amount or the thickness variation amount of the slide glass, the overall control unit 201 can adjust a focal point of the optical system included in the enlarged image capturing unit 120 of the microscope 10 and further improve focal point accuracy of an obtained enlarged image.

In addition, the overall control unit 201 can calculate a defocus position or a defocus amount of the sample based on the data regarding phase contrast images captured by the microscope 10. The overall control unit 201 can realize an automatic focusing function of the microscope 10 by controlling a stage position of the microscope 10 based on the calculated defocus position or the defocus amount of the sample.

The calculation process of the defocus amount and the like of the sample performed by the overall control unit 201 will be described below again in detail.

The overall control unit 201 obtains microscope image data regarding the thumbnail image and the enlarged image captured by the microscope 10 from the microscope 10, and develops the data or performs predetermined digital processing for the data. Thereafter, the overall control unit 201 uploads the microscope image data regarding the thumbnail image and the enlarged image to the image management server 30 via the network 3. Thereby, a microscope image of the sample captured by the microscope 10 can be observed from the image display device 40 which is a client device connected to the network 3.

As above, the entire configuration of the microscope control device 20 according to the embodiment has been described with reference to FIG. 2.

Configuration of Overall Control Unit

Figure 5:
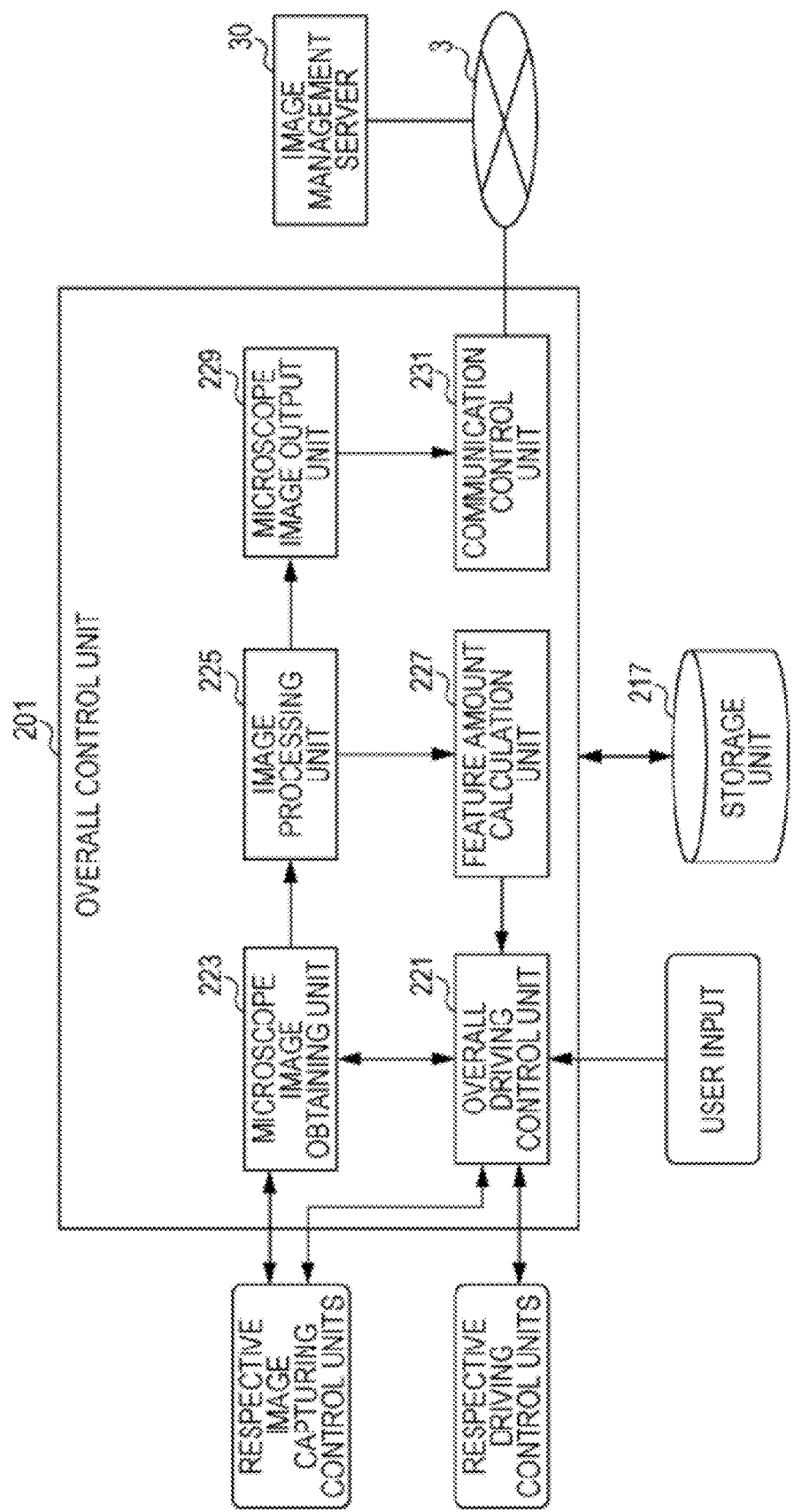
FIG. 5 is a block diagram illustrating a configuration of an overall control unit included in the microscope control device according to the same embodiment.

A configuration of the overall control unit 201 provided in the microscope control device 20 according to the embodiment will be described in detail with reference to FIG. 5. FIG. 5 is a block diagram illustrating a configuration of the overall control unit according to the embodiment.

The overall control unit 201 according to the embodiment mainly includes, for example, as shown in FIG. 5, an overall driving control unit 221, a microscope image obtaining unit 223, an image processing unit 225, a feature amount calculation unit 227, a microscope image output unit 229, and a communication control unit 231.

The overall driving control unit 221 is implemented by, for example, a CPU, a ROM, a RAM, and the like. The overall driving control unit 221 is a driving control unit which collectively controls the control units (the illumination control unit 203, the stage driving control unit 205, the condenser lens driving control unit 207, the phase contrast image capturing control unit 209, the thumbnail image capturing control unit 211, the enlarged image capturing control unit 213, and the filter driving control unit 215) controlling the respective parts of the microscope 10. The overall driving control unit 221 sets various kinds of information (for example, various kinds of setting parameters) in the respective parts of the microscope 10 or obtains various kinds of information from the respective parts of the microscope 10. The overall driving control unit 221 can output the various kinds of information obtained from the respective parts of the microscope 10 to the feature amount calculation unit 227 and the like described later.

In addition, in a case where a bar code is described or a so-called RF tag is installed in the sample of which a microscope image is captured, the overall driving control unit 221 can obtain various kinds of information described in the bar code or the RF tag. The overall driving control unit 221 can use the obtained information to control the control units controlling the respective parts of the microscope 10, or output the obtained information to the processing units such as the feature amount calculation unit 227 described later.

The microscope image obtaining unit 223 is implemented by, for example, a CPU, a ROM, a RAM, a communication device, and the like. The microscope image obtaining unit 223 obtains data corresponding to an thumbnail image captured by the thumbnail image capturing unit 110, data corresponding to an enlarged image captured by the enlarged image capturing unit 120, and data corresponding to phase contrast images captured by the defocus amount detection unit 130, via the respective imaging control units.

When obtaining image data via the respective imaging control units, the microscope image obtaining unit 223 outputs the obtained image data to the image processing unit 225 described later.

In addition, the microscope image obtaining unit 223 may store the obtained image data (microscope image data) in the storage unit 217 or the like after correlation with information regarding the obtained data and the like.

The image processing unit 225 is implemented by, for example, a CPU, a GPU, a ROM, a RAM, and the like. The image processing unit 225 performs a predetermined image process for the microscope image which is output from the microscope image obtaining unit 223.

Specifically, when obtaining the phase contrast image data, the thumbnail image data and the enlarged image data (more specifically, raw data for the images) output from the microscope image obtaining unit 223, the image processing unit 225 performs a development process for the raw data. In addition, the image processing unit 225 connects a plurality of images forming the images to each other (a stitching process) along with the development process of the image data.

The image processing unit 225 may perform a conversion process of obtained digital image data (transcode) as necessary. The conversion process of digital images may include a process for generating JPEG images or the like through compression of digital images, a process for converting data compressed to JPEG images or the like into compressed images having different formats (for example, a GIF format and the like). In addition, the conversion process of digital images includes a process where a second compression is performed after compressed image data is once decompressed and then undergoes a process such as an edge emphasis, a process for changing compression ratios of compressed images, and the like.

In a case where the image processing unit 225 has performed the above-described image process for the phase contrast image data, the phase contrast image data after the image process is output to the feature amount calculation unit 227. In addition, in the case where the image processing unit 225 has performed the above-described image process for the thumbnail image data and the enlarged image data, a microscope image formed by the images and metadata corresponding microscope image are output to the microscope image output unit 229 described later.

Further, a label where information (for example, the name of a person providing a sample, the date of the provision, the kind of staining, and the like) for specifying a corresponding sample is described may be attached to the sample used to generate the microscope image. In this case, the image processing unit 225 may perform, for example, a character recognition process for a part corresponding to the label in a thumbnail image, thereby grasping described contents. When specifying the contents described in the label, the image processing unit 225 may output the specified information to the overall driving control unit 221 or the like.

The feature amount calculation unit 227 is implemented by, for example, a CPU, a GPU, a ROM, a RAM, and the like. The feature amount calculation unit 227 obtains data regarding phase contrast images captured by the microscope 10, and calculates a defocus amount of the sample placed on the stage of the microscope 10, based on the phase contrast image data. In addition, the feature amount calculation unit 227 can calculate a defocus amount of the illumination field stop or a thickness variation amount of the slide glass, based on the phase contrast image data. By the use of the defocus amount or the thickness variation amount of the slide glass, the overall control unit 201 can adjust a focal point of the optical system included in the enlarged image capturing unit 120 of the microscope 10 and further improve focal point accuracy of an obtained enlarged image.

The above-described various kinds of feature amounts calculated by the feature amount calculation unit 227 are output to the overall driving control unit 221.

The microscope image output unit 229 is implemented by, for example, a CPU, a ROM, a RAM, and the like. The microscope image output unit 229 outputs the microscope image and the various kinds of information such as the metadata accompanied by the corresponding microscope image which are output from the image processing unit 225, to the image management server 30 via the communication control unit 231 described later. Thereby, the microscope image (digital microscope image) of a sample captured by the microscope 10 is managed by the image management server 30.

The communication control unit 231 is implemented by, for example, a CPU, a ROM, a RAM, a communication device, and the like. The communication control unit 231 controls communication between the overall control unit 201 and the image management server 30 provided outside the microscope control device 20, performed via the network 3 such as the Internet or dedicated lines.

In addition, an example of the function of the microscope control device 20 according to the embodiment has been described. Each of the above-described constituent elements may be constituted using general members or circuits, or may be constituted by hardware specific to the function of each constituent element. All the functions of the respective constituent elements may be performed by the CPU or the like. Therefore, a configuration to be used may be appropriately modified according to the technical level at the time when the embodiment is practiced.

Further, a computer program for realizing the respective functions of the microscope control device according to the embodiment as described above may be created and installed in a personal computer or the like. Further, it is possible to provide a recording medium which stores the computer program therein and is readable by a computer. The recording medium includes, for example, a magnetic disk, an optical disc, a magneto-optical disc, a flash memory, and the like. The computer program may be delivered via, for example, a network, without using the recording medium.

Automatic Focusing Process on Cell Tissue Sample

Next, an automatic focusing process on a cell tissue sample will be described briefly before a detailed configuration of the defocus amount detection unit 130 provided in the microscope 10 according to the embodiment is described.

As described above, in a case where a cell tissue sample is observed with a microscope, there is a case where the cell tissue is observed as it is in a state of being collected, however, there are many cases where the collected cell tissue undergoes various kinds of staining processes, and thus observed targets in the cell tissue are stained in predetermined colors. For example, in a case where the HE (Hematoxylin-Eosin) stain is performed for the cell tissue, a cell nucleus in the cell tissue is stained in blue, and a structure such as a cell membrane or a red blood cell is stained in pink to red.

When the stained cell tissue sample is imaged by the microscope, even if a physical positional relationship is the same as in the imaging element, a focal position which is an optimal position for observation is misaligned by about 1 μm. Such defocus results from the spherical aberration.

It is assumed that in order to perform focusing on the stained cell tissue sample where a cell nucleus is an observed target, an automatic focusing method of a so-called hill climbing method using an observed image is applied. In this case, it is assumed that a detection frame in the automatic focusing process is disposed at a position which does not include the cell nucleus as an observed target. At this time, in the automatic focusing method of the hill climbing method, only a defocused image of the targeted cell nucleus is captured. Therefore, in a case of using the automatic focusing method of the hill climbing method, there is use of an evaluation value of a focusing degree which reflects colors, sizes, and the like of structures in the detection frame.

However, the hill climbing method as described above has a problem in that focusing is difficult to perform at a high speed. In addition, in a case of realizing the high speed using partial scan (an image is read from the imaging element in a stripe shape) in the above-described hill climbing method, there is a problem in that the detection frame used to evaluate a focal point becomes very narrow in a captured and preserved image plane and the focal position accuracy is thereby damaged.

Therefore, the microscope 10 according to the embodiment employs a focal adjustment method (hereinafter, also referred to as a phase contrast method) using a phase contrast optical system (that is, the defocus amount detection unit 130) different from the main photographing optical system (that is, the enlarged image capturing unit 120 according to the embodiment). In the phase contrast method, a set of phase contrast images obtained through the phase contrast optical system are used as a reference image and a comparative image, respectively, as shown in FIG. 4. Further, in consideration of a micro image using a noted pixel and peripheral pixels located around the pixel for each pixel of the reference image, image regions having high correlation with the corresponding micro image are searched for in the comparative image. Thereafter, a defocus amount is calculated using a distance between two image regions obtained as a result of the search.

Since the above-described process is performed, the phase contrast method functions as a high-pass filter which enables structures (that is, low frequency components), which undergo the correlation process, having sizes greater than that of the micro image around each pixel to be difficult to detect. Since a microscope is generally used to observe very fine structures, it can be seen that the phase contrast method having the high-pass filter characteristic is compatible with the microscope as an optical device.

In the phase contrast method, the size of a micro region used for the correlation process is preferably two times the size of a structure which is intended to be in focus. In addition, if the size of the micro region in the correlation process is very small, detection errors are increased in the correlation process, which is thus not preferable.

Further, in order to selectively weight the focusing process according to colors of structures with a similar size, a method may be employed in which the imaging elements of the phase contrast optical system are used as color sensors, and evaluation values of focal positions are weighted using colors thereof. However, although an image element having high pixel density is suitable to maintain accuracy in phase contrast detection, an imaging element having a smaller number of pixels is suitable from the viewpoint of high speed reading or image processing. For this reason, using a Bayer arrangement image sensor, which is generally used, for the phase contrast detection is very disadvantageous in that pixel density regarding luminance is low and reading is slow.

As a result of that, based on these findings, the present inventors have keenly examined methods capable of more accurately performing focusing in the phase contrast method according to a difference in colors in a sample, and a method has been reached in which a filter is inserted into an optical path of the phase contrast optical system as described below.

Detailed Configuration of Defocus Amount Detection Unit

Next, with reference to FIGS. 6 to 11C, a detailed configuration of the defocus amount detection unit 130 provided in the microscope 10 according to the embodiment will be described.

Figure 6:
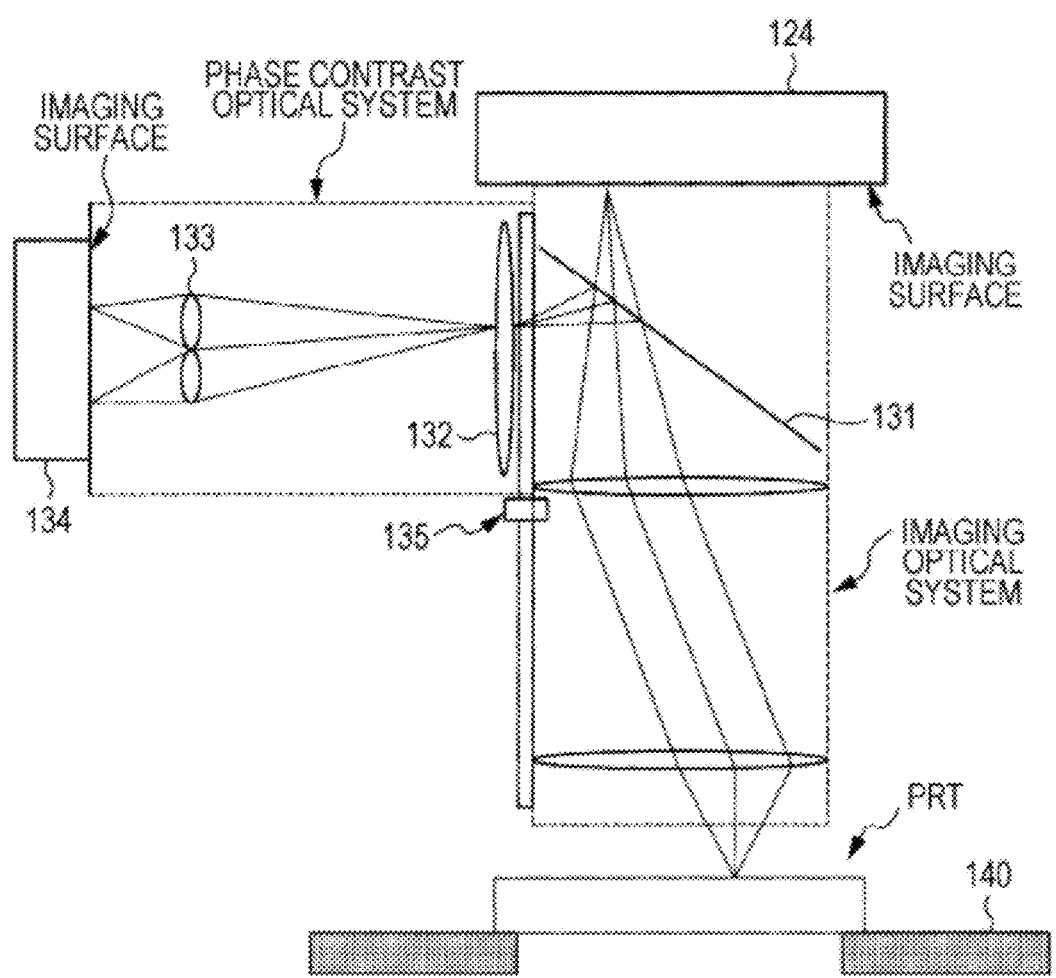
FIG. 6 is a diagram illustrating a defocus amount detection unit included in the microscope according to the same embodiment.

FIG. 6 is a schematic diagram illustrating optical systems of the enlarged image capturing unit 120 and the defocus amount detection unit 130 according to the embodiment. As shown in FIG. 6, the phase contrast optical system included in the defocus amount detection unit 130 according to the embodiment is split from an imaging optical system which is located on the rear side (a part between the stage 140 and the imaging element 124) of the enlarged image capturing unit 120.

As shown in FIG. 6, sample transmission light beams which are transmitted through the sample in the preparation PRT placed on the stage 140 pass through the optical elements such as the condenser lens provided in the imaging optical system, and form an image on an imaging surface of the imaging element 124.

Further, as shown in FIG. 6, the beam splitter 131 is provided on the optical path of the imaging optical system, a portion of the sample transmission light beams are split by the beam splitter 131, and the split sample transmission light beams are guided to the phase contrast optical system.

As such, in the microscope 10 according to the embodiment, the phase contrast microscope tube in which the phase contrast optical system capturing phase contrast images of the sample is provided is split from the main microscope tube in which the imaging optical system capturing an enlarged image of the sample is provided. Thereby, in the microscope 10 according to the embodiment, when capturing of phase contrast images for detecting focal points and capturing of an enlarged image are continuously performed, mechanical changing of the optical systems is not necessary.

Further, since the phase contrast optical system for capturing phase contrast images is split from the imaging optical system for capturing an enlarged image of the sample, it is possible to freely insert a stop or a filter into the optical path of the phase contrast optical system after being split. As a result, in the microscope 10 according to the embodiment, it is possible to freely vary a depth of field or a wavelength characteristic in the phase contrast optical system without having influence on an enlarged image captured by the imaging optical system.

The present inventors pay attention to the above-described characteristics of the phase contrast optical system according to the embodiment, and realize a focusing method taking into account defocus which occurs due to a difference in colors in the sample by inserting an optical filter absorbing light of a predetermined wavelength into the optical path of the phase contrast optical system.

More specifically, in the phase contrast optical system according to the embodiment, an optical filter which absorbs a wavelength band corresponding to a complementary color of a color staining an observed target in a staining method performed for a cell tissue sample, is inserted into the optical path of the phase contrast optical system by a filter inserting mechanism 135. By inserting such an optical filter into the optical path, the intensity of an image which other types of stained tissue than the observed target draw on phase contrast images can be reduced, and thus the intensity of an image which the stained tissue, which is an observed target, draws on the phase contrast images is relatively increased. As a result, a focal position of the stained tissue which is an observed target is preferentially selected in the defocus amount detection process using the phase contrast images.

For example, a cell tissue slice undergoing the HE (Hematoxylin-Eosin) stain is considered. In the HE stained cell tissue, a cell nucleus, bone tissue, a part of cartilage tissue, serous component and the like, are stained in blue by Hematoxylin pigments, and cell cytoplasm, connective tissue of soft tissue, red blood cells, endocrine granules, and the like are stained in red by Eosin pigments. The staining color difference causes spherical aberration, in turn, resulting in a difference in focal positions where the structures stained in the respective colors form images clearly. Specifically, a focal position of a structure stained in red is located by about 1 μm apart from that of the structure stained in blue, which is located at the same place. For this reason, for example, in a cell tissue slice in which a cell nucleus is an observed target, if focusing is mainly performed for cell cytoplasm tissue, there is a concern that an optimal focal position may not be given to the cell nucleus.

Therefore, in a case where the cell nucleus is an observed target (or main purpose of observation), the filter inserting mechanism 135 inserts a red optical filter corresponding to a complementary color of blue into the optical path of the phase contrast optical system, and thereby the intensity of an image which the cell cytoplasm tissue stained in red draws on phase contrast images is reduced. As a result, a focal position of the cell nucleus tissue stained in blue is preferentially selected.

In contrast, in a case where a structure stained in red such as cell cytoplasm or a red blood cell, is a main purpose of observation, the filter inserting mechanism 135 inserts a blue optical filter into the optical path of the phase contrast optical system, and thereby the intensity of an image which the cell nucleus tissue stained in blue draws on the phase contrast images is reduced. As a result, a focal position of the cell cytoplasm tissue or the red blood cell stained in red is preferentially selected.

In addition, although the HE stain has been described as an example in the above example, a focal position of an observed target can be preferentially selected in other staining methods in a similar manner.

For example, the Gram stain is a staining method used to decide whether a bacterium is Gram positive or negative. A Gram positive bacterium is stained in blue to bluish purple, and a Gram negative bacterium is stained in pink to red. Therefore, if the Gram positive bacterium is an observed target, a focal position of the Gram positive bacterium can be preferentially selected by inserting a red optical filter. In contrast, if the Gram negative bacterium is an observed target, a focal position of the Gram negative bacterium can be preferentially selected by inserting a blue optical filter.

Further, the Ziehl-Neelsen stain is a staining method used to observe a bacterial body such as a tuberculosis bacterium. A bacterial body is stained in red, and other parts than the bacterial body are stained in blue to green. Therefore, by inserting blue to green optical filters into the phase contrast optical system, a focal position of the bacterial body can be preferentially selected.

The above-described staining methods are only an example, and even in staining methods other than the above-described methods, a focal position of an observed target can be preferentially selected by inserting an optical filter of a color having a complementary relationship with a color of an observed target.

Figure 7:
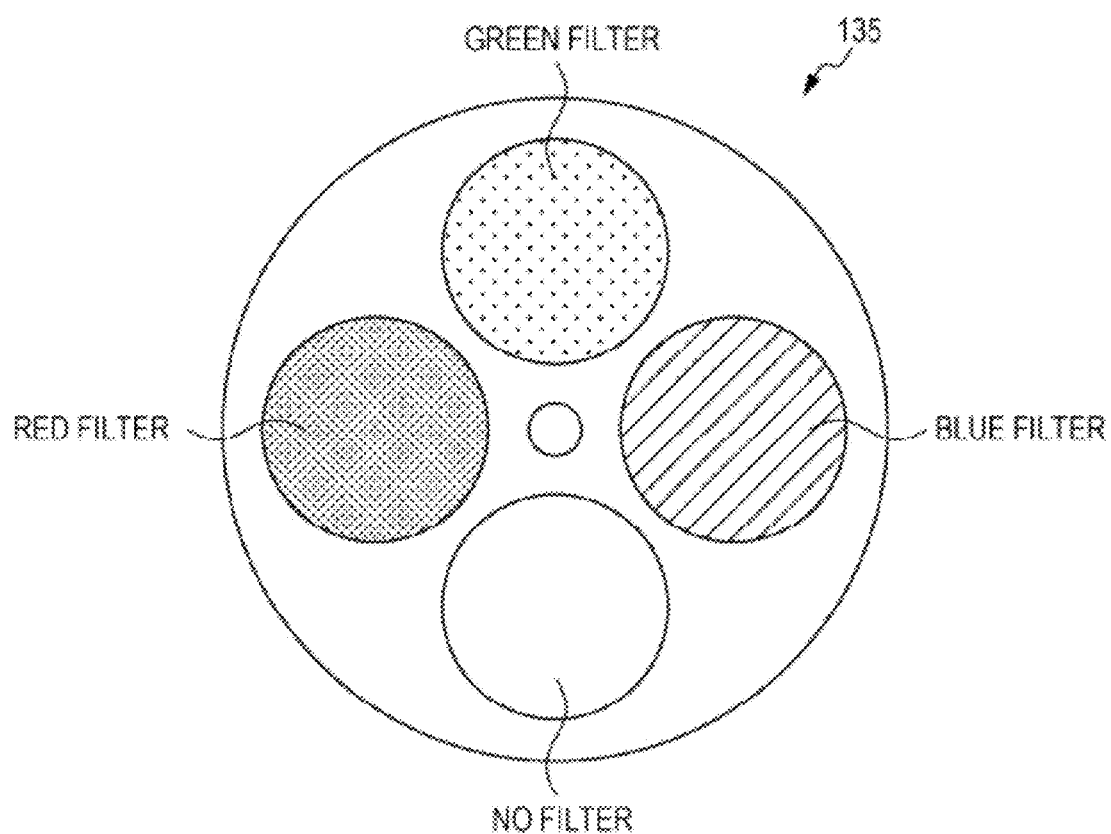
FIG. 7 is a diagram illustrating a defocus amount detection unit included in the microscope according to the same embodiment.

Here, as an example of the filter inserting mechanism 135, a revolver as shown in FIG. 7 may be used. FIG. 7 is a diagram illustrating an example of the filter inserting mechanism according to the embodiment.

The revolver which is an example of the filter inserting mechanism 135 is formed by, for example, providing one or a plurality of through-holes on a substrate with a circular plate shape, and optical filters absorbing light of a predetermined wavelength are installed in the provided through-holes. A rotation shaft is provided around the center of the revolver, and the filter driving control unit 215 controls rotation of the rotation shaft, thereby selectively inserting the optical filters having different frequency characteristics (that is, absorption wavelength bands) into the optical path of the phase contrast optical system. In addition, a through-hole where the optical filter is not installed is provided among the through-holes provided on the revolver, and thereby it is possible to select a state where the optical filter is not inserted into the phase contrast optical system.

For example, in the example shown in FIG. 7, three optical filters of a red filter, a blue filter, and a green filter are installed as the optical filters having different frequency characteristics, and the through-hole having no optical filter is installed. The filter driving control unit 215 can select four filter inserting states including the state where an optical filter is not inserted, by controlling rotation of the rotation shaft of the revolver.

Here, the size of the through-hole provided on the revolver may be determined such that the optical filter entirely includes diameters of light beams so as to correspond to the diameters of the light beams at a part of the phase contrast optical system into which the optical filter is inserted.

Figure 8:
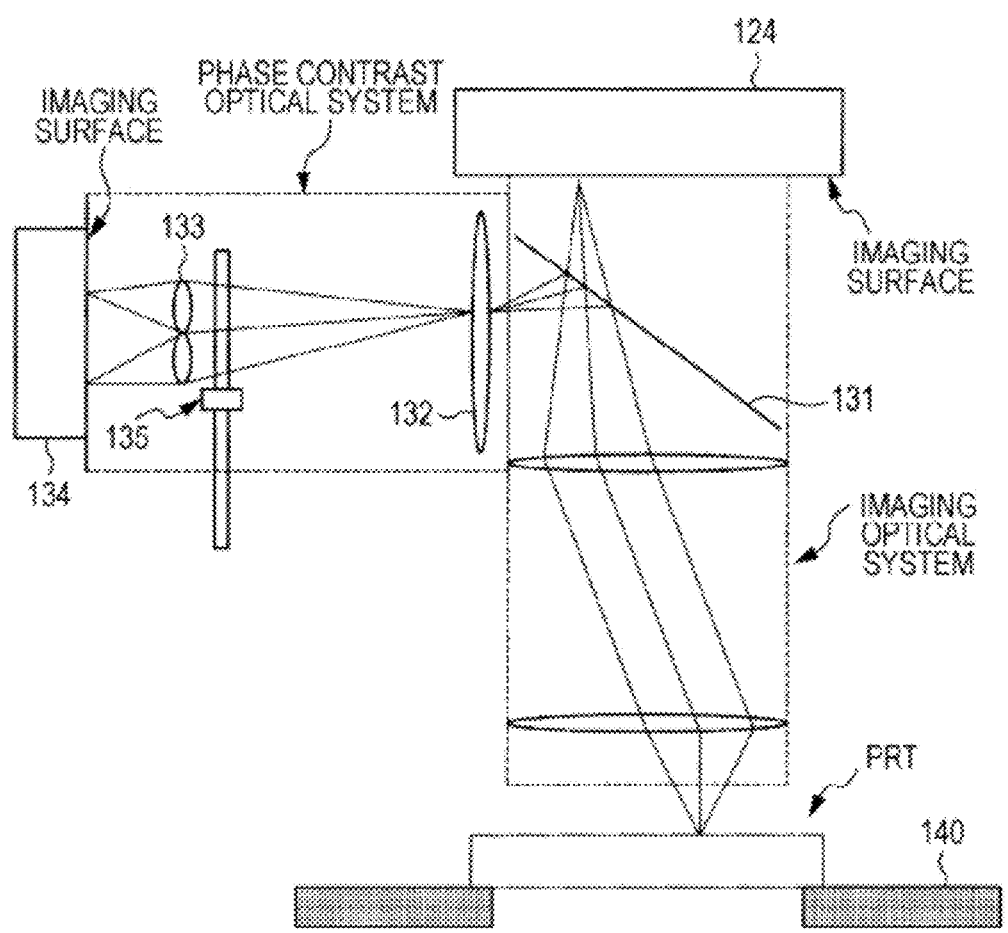
FIG. 8 is a diagram illustrating a defocus amount detection unit included in the microscope according to the same embodiment.

In addition, a position into which the optical filter is inserted in the phase contrast optical system may be on the front side of the field lens 132 (the beam splitter 131 side) as shown in FIG. 6, or may be on the rear side of the field lens 132 (the imaging element 134 side) as shown in FIG. 8. Further, in a case where the optical filter is inserted into the front side of the field lens 132, the optical filter is inserted into a part which does not have influence on light beams traveling through the imaging optical system in order not to have influence on an enlarged image captured by the imaging optical system. In addition, in a case where the optical filter is inserted into the rear side of the field lens 132, the optical filter may be inserted between the field lens 132 and the separator lens 133 as shown in FIG. 8, or the optical filter may be inserted between the separator lens 133 and the imaging element 134.

In the case where the optical filter is inserted into the front side of the field lens 132, non-uniformity of the chief ray axis (CRA) to the optical filter is reduced. Thereby, a part of images generating phase contrast images have little influence on a wavelength selected by the optical filter. Meanwhile, it is necessary for the optical filter to have a very large aperture, and thus costs of optical filters are increased, or the size of the filter inserting mechanism 135 is increased.

On the other hand, in a case where the optical filter is inserted into the rear side of the field lens 132, an optical filter having a small aperture can be used. However, in this case, there is a possibility that the chief ray axis (CRA) widely varies at the respective parts of the imaging element 134, and non-uniformity occurs in the wavelength characteristic of images formed on the respective parts of the imaging element 134.

Figure 9:
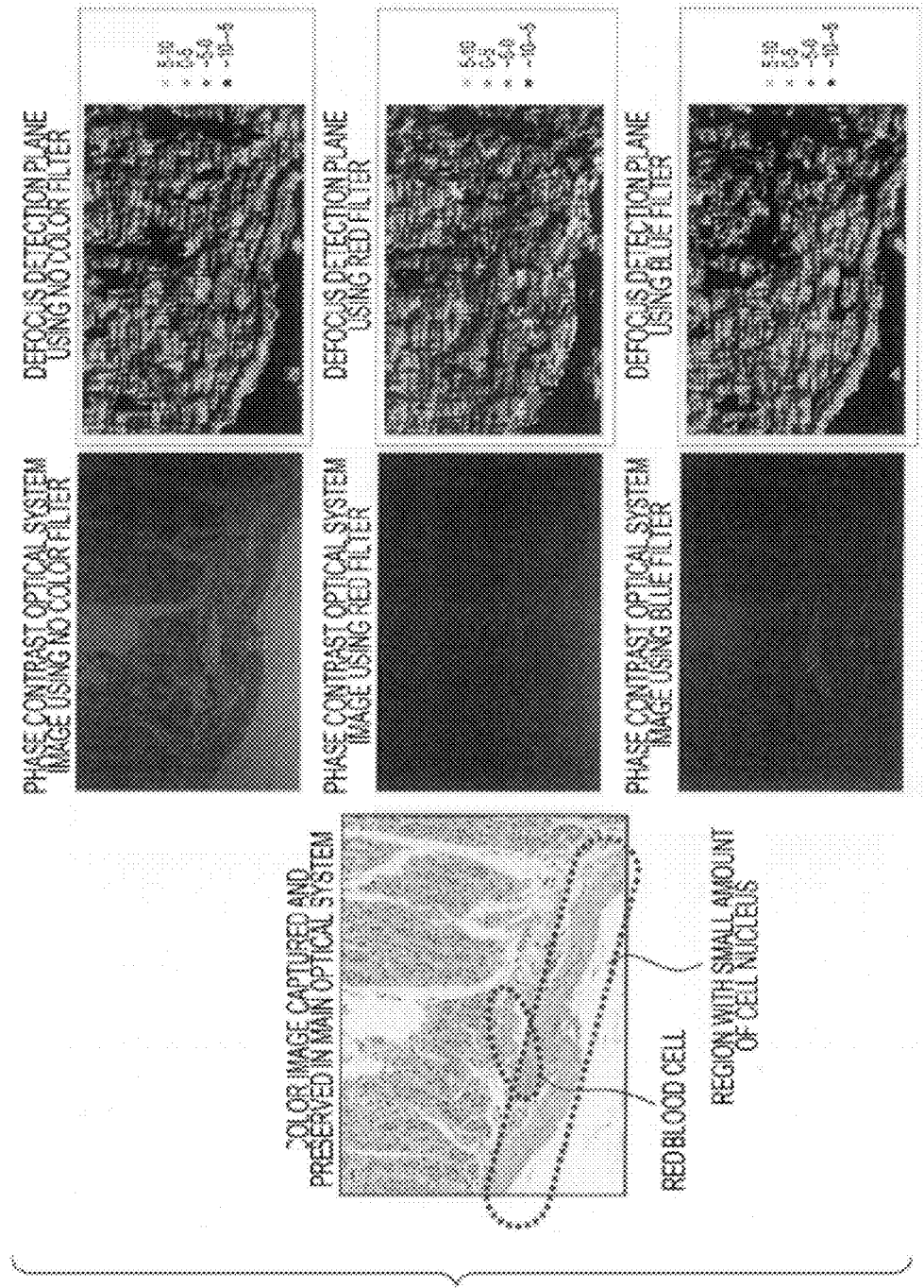
FIG. 9 is a diagram illustrating an example of a detection result of the defocus amount.

FIG. 9 shows microscope images obtained by imaging the HE stained cell tissue sample using the above-described optical filter. Among the microscope images shown in FIG. 9, from the enlarged image of the sample captured by the enlarged image capturing unit 120, it can be seen that there is a region where cell nuclei are little and a region where red blood cells are much in the cell tissue sample. Since the HE stain is performed for the sample, the cell nuclei are stained in blue, and the cell cytoplasm or the red blood cells are stained in red.

Three kinds of phase contrast images of the cell tissue sample, that is, phase contrast images captured without inserting the color filter, phase contrast images captured by inserting the red filter, and phase contrast images captured by inserting the blue filter, are obtained, and the defocus amount detection process is performed for the phase contrast images. FIG. 9 shows one of the obtained phase contrast images and a corresponding defocus detection plane, respectively.

Figure 10:
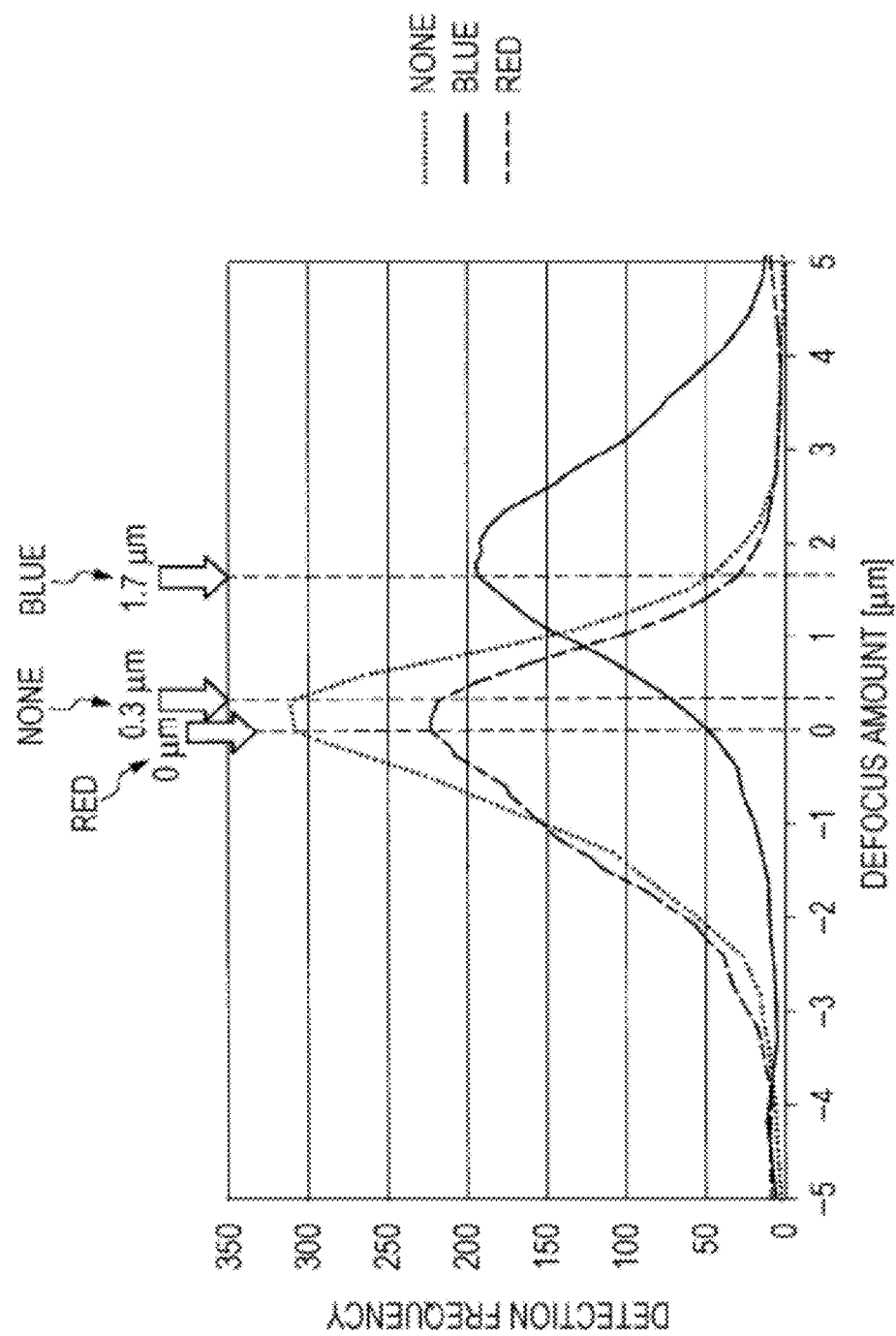
FIG. 10 is a diagram illustrating an example of a detection result of the defocus amount.

In addition, FIG. 10 is a graph illustrating a defocus amount detected using the three kinds of phase contrast images shown in FIG. 9. The graph in FIG. 10 shows relative defocus amounts indicated using a defocus amount of when the red filter is inserted (that is, when the imaging is performed such that the cell nuclei are emphasized) as a reference. As clear from FIG. 10, it can be seen that the defocus amount of the phase contrast images captured without inserting the optical filter is 0.3 μm, and the cell nucleus is out of focus. In addition, it can be seen that the defocus amount of the phase contrast images captured by inserting the blue filter (so as to be suitable for the cell cytoplasm or the red blood cell) is 1.7 μm, and the cell nucleus is completely out of focus.

As such, by inserting a predetermined optical filter into the phase contrast optical system, focusing which pays attention to a structure of the stained cell tissue is possible when a defocus amount and a shape of the entire observed plane are instantly obtained using the captured phase contrast images and the image processing. Thereby, in the microscope 10 and the microscope control device 20 according to the embodiment, it is possible to capture a clear image (enlarged image) which is suitable for an observed target.

In addition, the overall driving control unit 221 may determine rotation based on information regarding a user input which is obtained by the overall driving control unit 221, and the overall driving control unit 221 may control the filter inserting mechanism 135 via the filter driving control unit 215. In addition, a user of the microscope 10 may directly manually control the filter inserting mechanism 135 such as a revolver.

The user of the microscope 10 may manually select an optical filter to be inserted according to an observation purpose before observation of a slide or during the observation of the slide, or may automatically select an optical filter by the microscope control device 20 (more specifically, the overall driving control unit 221). In a case where the overall driving control unit 221 automatically selects an optical filter to be inserted, the overall driving control unit 221 can use sample information accompanied by a cell tissue sample.

The sample information, which is unique to an individual cell tissue sample, includes the name of a person providing the sample, the date of the provision, a provided site, the kind of stain, and the like.

Figure 11A:
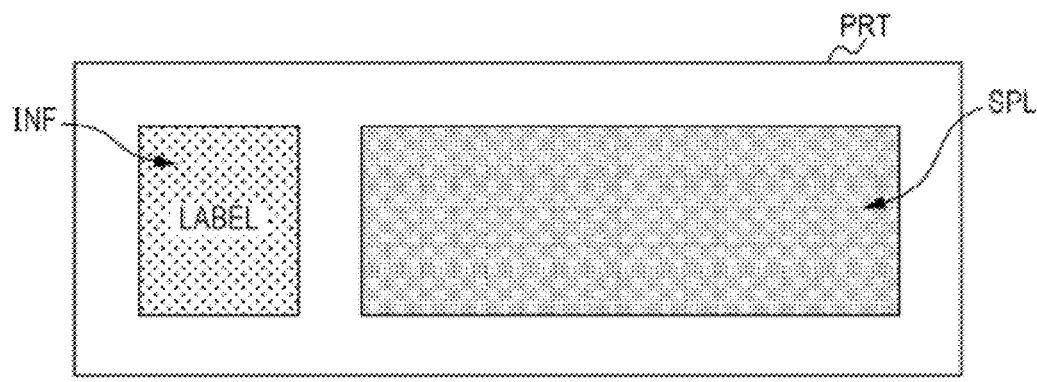
FIGS. 11A to 11C are diagrams illustrating sample information according to the same embodiment.
Figure 11B:
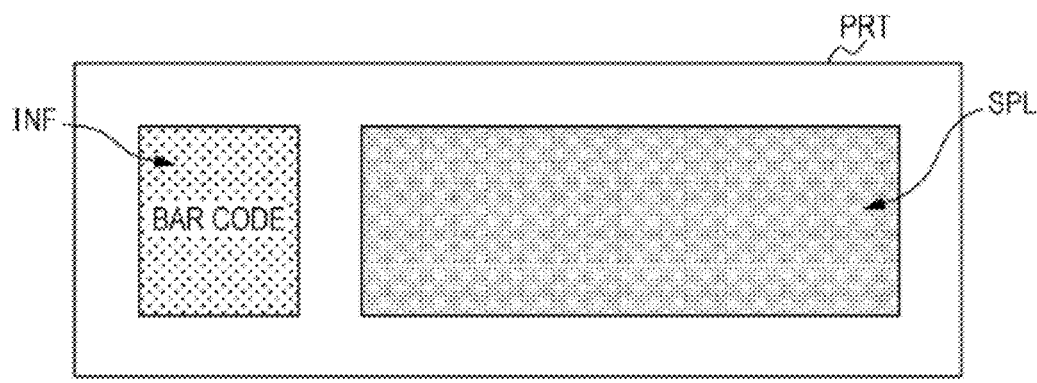
Figure 11C:
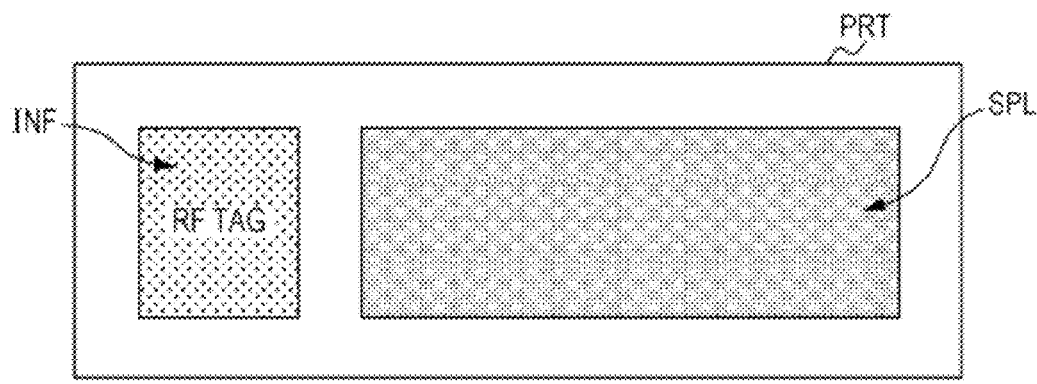

The sample information may be described in the preparation PRT of the cell tissue sample as a label (that is, character information) as shown in FIG. 11A, or may be described as a bar code as shown in FIG. 11B. In addition, the sample information may be stored in an RF tag which is embedded in the preparation PRT as shown in FIG. 11C.

As shown in FIG. 11A or 11B, in a case where the sample information is accompanied by the preparation PRT as character information or a bar code, the image processing unit 225 can obtain the described information by, for example, performing an image process for a thumbnail image of the cell tissue sample. In addition, as shown in FIG. 11C, in a case where the sample information is stored in the RF tag, the overall control unit 201 or the overall driving control unit 221 can obtain the information stored in the RF tag by reading the information using a predetermined method.

The overall driving control unit 221 grasps a type of staining method or an observed target from the obtained sample information, and may select an optical filter to be inserted by using a database describing a correspondence relationship between staining methods and observed targets, stored in the storage unit 217 or the like.

Flow of Filter Inserting Method

Figure 12:
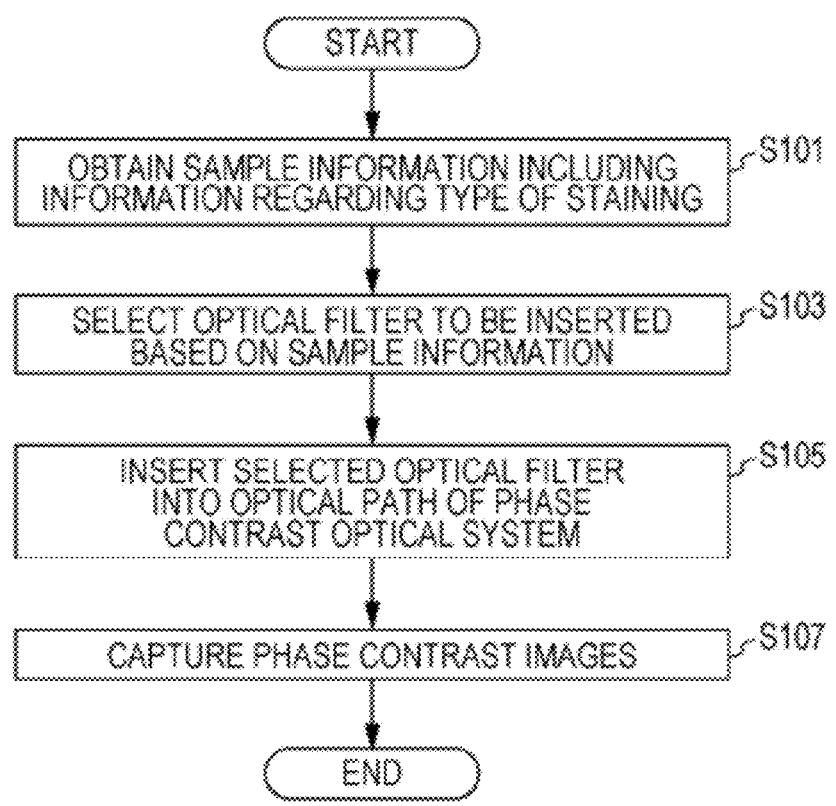
FIG. 12 is a flowchart illustrating an example of a filter inserting method according to the same embodiment.

Next, with reference to FIG. 12, an example of the flow of the filter inserting method according to the embodiment will be described briefly. FIG. 12 is a flowchart illustrating an example of the flow of the filter inserting method according to the embodiment.

First, the overall driving control unit 221 of the microscope control device 20 obtains sample information including information regarding a type of stain and the like attached to a cell tissue sample (step S101). The sample information is obtained using a suitable method regarding each condition where the sample information is attached to the cell tissue sample. Thereafter, the overall driving control unit 221 selects an optical filter to be inserted based on the obtained sample information (step S103).

When an optical filter to be inserted is determined, the overall driving control unit 221 transmits information regarding the determined optical filter to the filter driving control unit 215. The filter driving control unit 215 generates a control signal for inserting the designated optical filter into the optical path of the phase contrast optical system based on the information regarding the optical filter transmitted from the overall driving control unit 221, and controls the filter inserting mechanism 135.

The filter inserting mechanism 135 inserts the selected optical filter into the optical path of the phase contrast optical system under the control of the filter driving control unit 215 (step S105).

When the selected optical filter is inserted into the optical path of the phase contrast optical system, the overall driving control unit 221 requests the phase contrast image capturing control unit 209 to capture phase contrast images. In turn, the phase contrast image capturing control unit 209 controls the defocus amount detection unit 130 (particularly, the imaging element 134) to capture phase contrast images (step S107).

The overall control unit 201 of the microscope control device 20 appropriately and accurately calculates a focal position of the cell tissue sample placed on the stage 140 by analyzing the captured phase contrast images. Thereby, in the microscope 10 and the microscope control device 20 according to the embodiment, focusing which pays attention to a structure of the stained cell tissue is possible.

Hardware Configuration

Figure 13:
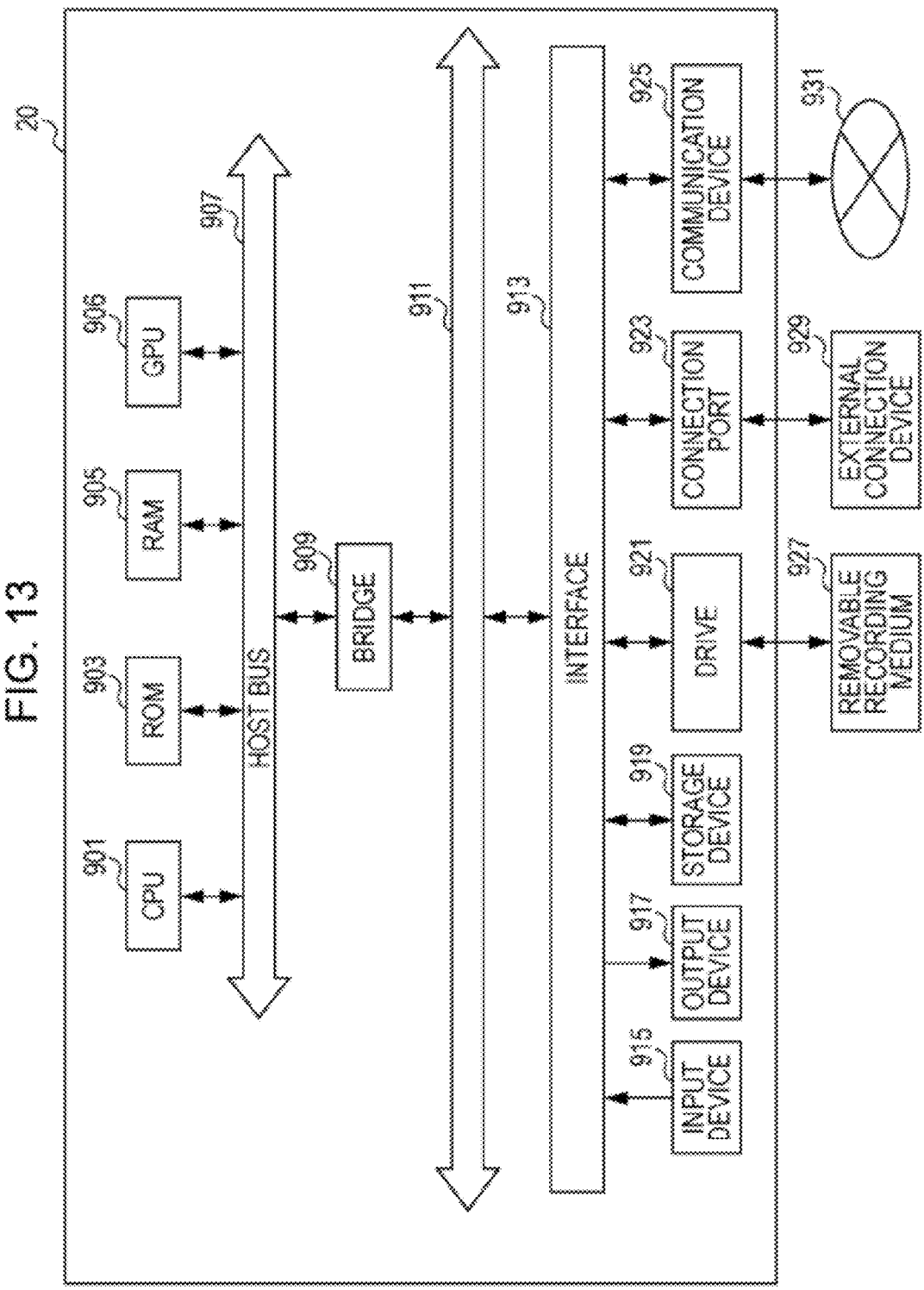
FIG. 13 is a block diagram illustrating a hardware configuration of the microscope control device according to an embodiment.

A hardware configuration of the microscope control device 20 according to the embodiment will be described in detail with reference to FIG. 13. FIG. 13 is a block diagram illustrating a hardware configuration of the microscope control device 20 according to the embodiment.

The microscope control device 20 mainly includes a CPU 901, a ROM 903, a RAM 905, and a GPU (Graphics Processing Unit) 906. In addition, the microscope control device 20 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls the whole operation of the microscope control device 20 or a portion thereof according to various kinds of programs recorded in the ROM 903, the RAM 905, the storage device 919, or a removable recording medium 927. The ROM 903 stores programs or operational parameters used by the CPU 901. The RAM 905 primarily stores programs used by the CPU 901, parameters which are appropriately varied in executing the programs, or the like. In addition, the GPU 906 functions as an arithmetic processing unit and a control device, which performs an arithmetic process regarding various kinds of image processes performed in the microscope control device 20. The GPU 906 controls all operations of the image processes in the microscope control device 20 or a portion thereof according to various kinds of programs recorded in the ROM 903, the RAM 905, the storage device 919, or a removable recording medium 927. They are connected to each other via the host bus 907 formed by internal buses such as a CPU bus.

The host bus 907 is connected to the external bus 911 such as a PCI (Peripheral Component Interconnect/Interface) bus via the bridge 909.

The input device 915 is an operation device which is operated by a user, such as, for example, a mouse, a keyboard, a touch panel, a button, a switch, and a lever. In addition, the input device 915 may be, for example, a remote control device (a so-called remote controller) using infrared rays or other electric waves, or may be an external connection device 929 such as a mobile phone or a PDA supporting the operation of the microscope control device 20. Further, the input device 915 is constituted by, for example, an input control circuit or the like, which generates an input signal based on information input by a user using the operation device and outputs the input signal to the CPU 901. A user of the microscope control device 20 can input various kinds of data to the microscope control device 20 or instruct the microscope control device 20 to perform processes by operating the input device 915.

The output device 917 includes devices which can notify a user of obtained information in a visible or audible manner. These devices include display devices such as CRT display devices, liquid crystal displays, plasma display panels, EL displays, and lamps, audio output devices such as speakers and headphones, printer devices, mobiles phones, facsimiles, and the like. The output device 917 outputs, for example, results obtained by various kinds of processes performed by the microscope control device 20. Specifically, the display device displays results obtained by various kinds of processes performed by the microscope control device 20, as a text or an image. On the other hand, the audio output device converts an audio signal including reproduced audio data, sound data, or the like into an analog signal so as to be output.

The storage device 919 is a device for storing data, which is formed as an example of a storage unit of the microscope control device 20. The storage device 919 includes, for example, a magnetic storage device such as an HDD (Hard Disk Drive), a semiconductor storage device, an optical storage device, a magneto-optical storage device, and the like. The storage device 919 stores programs or various kinds of data executed by the CPU 901, various kinds of data obtained from an external device, and the like.

The drive 921 is a reader and writer for a recording medium, and is embedded in or installed outside the microscope control device 20. The drive 921 reads information recorded in the removable recording medium 927 such as a magnetic disk, an optical disc, a magneto-optical disc, or a semiconductor memory, which is installed, and outputs the read information to the RAM 905. In addition, the drive 921 writes information in the removable recording medium 927 such as a magnetic disk, an optical disc, a magneto-optical disc, or a semiconductor memory, which is installed. The removable recording medium 927 includes, for example, a DVD medium, an HD-DVD medium, a Blu-ray medium, and the like. In addition, the removable recording medium 927 may be a Compact Flash (CF, registered trademark), a flash memory, an SD (Secure Digital) memory card, or the like. Further, the removable recording medium 927 may be, for example, an IC (Integrated Circuit) card or electronic equipment mounting a non-contact IC chip thereon.

The connection port 923 is used to directly connect a device to the microscope control device 20. An example of the connection port 923 includes a USB (Universal Serial Bus) port, an IEEE1394 port, an SCSI (Small Computer System Interface) port, and the like. Other examples of the connection port 923 include an RS-232C port, an optical audio terminal, an HDMI (High-Definition Multimedia Interface) port, and the like. The external connection device 929 is connected to the connection port 923, and thereby the microscope control device 20 directly obtains various kinds of data from the external connection device 929 or provides various kinds of data to the external connection device 929.

The communication device 925 is, for example, a communication interface constituted by a communication device and the like for connection to a communication network 931. The communication device 925 may be, for example, a communication card or the like for a wired or wireless LAN (Local Area Network), Bluetooth (registered trademark), or a WUSB (Wireless USB). In addition, the communication device 925 may be a router for optical communication, a router for ADSL (Asymmetric Digital Subscriber Line), a modem for various kinds of communication, or the like. This communication device 925 can transmit and receive a signal to and from, for example, the Internet or other communication devices, based on a predetermined protocol such as, for example, TCP/IP. In addition, the communication network 931 connected to the communication device 925 is formed by a network or the like connected in a wired or wireless manner, and may be, for example, the Internet, a home LAN, infrared communication, radio wave communication, various kinds of dedicated communication, satellite communication, or the like.

As such, an example of the hardware configuration capable of realizing the function of the microscope control device 20 according to the embodiment has been described. Each of the above-described constituent elements may be constituted using general members, or may be constituted by hardware specific to the function of each constituent element. Therefore, a hardware configuration to be used may be appropriately modified according to the technical level at the time when the embodiment is practiced.

Conclusion

As described above, the microscope and the microscope control device according to the embodiment, it is possible to perform focusing which pays attention to an observed target by inserting a predetermined optical filter into the optical path of the phase contrast optical system according to a staining state of the observed target. Thereby, in the microscope and the microscope control device according to the embodiment, it is possible to capture a clear enlarged image suitable for the observed target.

In addition, in a general single lens reflex camera or a camera for television broadcasting, there is a technique in which an IR cutoff filter is provided in front of an AF imaging element to be removable, and a focal point is detected while securing a light amount necessary for imaging. However, in the microscope and the microscope control device according to the embodiment unlike in the technique, the optical filter is inserted in order to appropriately and accurately focus on an observed target under the circumstances termed a microscope having a low depth of field, which is thus completely different from the technique used for the above-described camera.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A microscope comprising:
   a first imaging optical system that images light beams from a cell tissue sample placed on a stage;
   a second imaging optical system having a light beam splitting element which splits a portion of the light beams from the cell tissue sample from the first imaging optical system and a separator lens that generates a first portion of the light beams and a second portion of the light beams as phase contrast images having a longitudinal width and a transverse width of the cell tissue sample, and an imaging element, which includes a plurality of pixels in the longitudinal width and transverse width directions, and captures the phase contrast images of the first portion of the light beams and the second portion of the light beams, which have been split, from the cell tissue sample; and
   a filter inserting unit that inserts an optical filter absorbing light of a predetermined wavelength into an optical path of the second imaging optical system,
   wherein the filter inserting unit inserts the optical filter which absorbs light of a wavelength corresponding to a color having a complementary relationship with a color of an observed target in the cell tissue sample.

2. The microscope according to claim 1, wherein the second imaging optical system at least includes:
   a condensing lens that collects a portion of the light beams from the cell tissue sample, split by the light beam splitting element,
   wherein the filter inserting unit inserts the optical filter between the light beam splitting element and the condensing lens.

3. The microscope according to claim 1, wherein the second imaging optical system at least includes:
   a condensing lens that collects a portion of the light beams from the cell tissue sample, split by the light beam splitting element,
   wherein the filter inserting unit inserts the optical filter into a rear side of the condensing lens.

4. The microscope according to claim 1, wherein the cell tissue sample includes sample information regarding a staining method of cell tissue and at least one part of the cell tissue, and
   wherein the filter inserting unit automatically selects the optical filter to be inserted based on the sample information.

5. The microscope according to claim 4, wherein the sample information is described as a label for the cell tissue sample.

6. The microscope according to claim 4, wherein the sample information is described in the cell tissue sample as a bar code.

7. The microscope according to claim 4, wherein the sample information is described in a radio frequency (RF) tag which is embedded in the cell tissue sample.

8. A filter inserting method comprising:
   causing a light beam splitting element to split a portion of light beams from a cell tissue sample from a first imaging optical system, which images the light beams from the cell tissue sample placed on a stage, and a separator lens to generate a first portion of the light beams and a second portion of the light beams as phase contrast images having a longitudinal width and a transverse width of the cell tissue sample;
   inserting an optical filter absorbing light of a predetermined wavelength into an optical path of a portion of the light beams, which have been split, from the cell tissue sample; and
   capturing, with an imaging element, which includes a plurality of pixels in the longitudinal width and transverse width directions, the phase contrast images of the first portion of the light beams and the second portion of the light beams from the cell tissue sample, transmitted through the optical filter,
   wherein the inserting of the optical filter includes inserting the optical filter which absorbs light of a wavelength corresponding to a color have a complementary relationship with a color of an observed target in the cell tissue sample.

* * * * *